(12) United States Patent
Best

(10) Patent No.: US 6,921,336 B1
(45) Date of Patent: Jul. 26, 2005

(54) LINKED ELECTRONIC GAME SYSTEMS

(76) Inventor: Robert M. Best, 758 Kapahulu Ave., Box 610, Honolulu, HI (US) 96816

( * ) Notice: Subject to any disclaimer, the term of this patent is extended or adjusted under 35 U.S.C. 154(b) by 136 days.

(21) Appl. No.: 10/677,602

(22) Filed: Oct. 2, 2003

Related U.S. Application Data

(62) Division of application No. 09/853,487, filed on May 10, 2001.

(51) Int. Cl.$^7$ ................................................ A63F 13/00
(52) U.S. Cl. ............................. 463/32; 463/33; 463/40
(58) Field of Search ................................. 463/1, 30–32, 463/37, 39–40

(56) References Cited

U.S. PATENT DOCUMENTS

| | | |
|---|---|---|
| 4,218,582 A | 8/1980 | Hellman et al. |
| 4,278,837 A | 7/1981 | Best |
| 4,405,829 A | 9/1983 | Rivest et al. |
| 4,433,207 A | 2/1984 | Best |
| 4,670,857 A | 6/1987 | Rackman |
| 4,677,604 A | 6/1987 | Selby et al. |
| 4,694,412 A | 9/1987 | Domenik et al. |
| 4,817,140 A | 3/1989 | Chandra et al. |
| 5,134,391 A | 7/1992 | Okada |
| 5,184,830 A | 2/1993 | Okada et al. |
| 5,428,528 A | 6/1995 | Takenouchi et al. |
| 5,457,668 A | 10/1995 | Hibino et al. |
| 5,550,999 A | 8/1996 | Nagano et al. |
| 5,577,121 A | 11/1996 | Davis et al. |
| RE35,839 E | 7/1998 | Asai et al. |
| 5,778,421 A | 7/1998 | Nagano et al. |
| 5,809,140 A | 9/1998 | Rubin |
| 5,826,011 A | 10/1998 | Chou et al. |
| 5,850,230 A | 12/1998 | San et al. |
| 5,881,038 A | 3/1999 | Oshima et al. |
| 5,937,066 A | 8/1999 | Gennaro et al. |

(Continued)

FOREIGN PATENT DOCUMENTS

| | | |
|---|---|---|
| EP | 0 976 429 A1 | 2/2000 |
| GB | 2365361 A | 2/2002 |
| GB | 2366025 A | 2/2002 |

OTHER PUBLICATIONS http://www.btinternet.com/~ahcox/GBA/© 2000–2003.*
Data Encryption Standard (DES); FIPS PUB 46–3 Reaffirmed Oct. 25, 1999; U.S. Department of Commerce/National Institute of Standards and Technology.
Internet site: www.jharbour.com/gameboy/GBA_02.pdf pp. 46–65 Jonathan S. Harbour, *Game Boy Architecture in a Nutshell* 2003.
Internet site: www/cs.rit.edu/%7Etjh8300/CowBite/CowBiteSpec.htm Tom Happ, *CowBite Virtual Hardware Specifications* Aug. 4, 2002.

Primary Examiner—Derris H. Banks
Assistant Examiner—Robert E. Mosser
(74) Attorney, Agent, or Firm—Graybeal Jackson Haley LLP

(57) ABSTRACT

A video game system that includes a console and hand-held controllers with LCD screens. Each game operates in a simulated world populated with animated characters and static objects which are displayed on a TV screen, and are also displayed on the LCD screens of the hand-held controllers. While one part of the simulated world is displayed on the TV screen, different parts of the simulated world may appear on the LCD screens in a natural pictorial setting. Alternatively, some of the pictures displayed on LCD screens and TV screens may represent the same part of the simulated world at different times, or the same part at the same time. Pictures displayed on an LCD screen may appear concurrently or later on the TV screen. Objects and characters can be selected, moved, constructed, changed, or deleted by a player without revealing to other players these objects of interest or their disposition. This video game system will provide a new game experience in which hand-held controllers do more than just control a console game, and also do more than just a standalone hand-held game.

126 Claims, 17 Drawing Sheets

U.S. PATENT DOCUMENTS

| | | | |
|---|---|---|---|
| 5,971,855 A * | 10/1999 | Ng | 463/42 |
| 6,022,274 A | 2/2000 | Takeda et al. | |
| 6,034,937 A | 3/2000 | Kumagai | |
| 6,071,191 A | 6/2000 | Takeda et al. | |
| 6,081,785 A | 6/2000 | Oshima et al. | |
| 6,132,315 A | 10/2000 | Miyamoto et al. | |
| 6,139,433 A | 10/2000 | Miyamoto et al. | |
| 6,175,629 B1 | 1/2001 | Gotoh et al. | |
| 6,190,257 B1 | 2/2001 | Takeda et al. | |
| 6,220,964 B1 | 4/2001 | Miyamoto et al. | |
| 6,238,291 B1 * | 5/2001 | Fujimoto et al. | 463/44 |
| 6,256,391 B1 | 7/2001 | Ishiguro et al. | |
| 6,339,815 B1 | 1/2002 | Feng et al. | |
| 6,342,892 B1 | 1/2002 | Van Hook et al. | |
| 6,360,320 B1 | 3/2002 | Ishiguro et al. | |
| 6,369,827 B1 | 4/2002 | Pan et al. | |
| 6,468,160 B2 | 10/2002 | Elliott | |
| 6,478,679 B1 | 11/2002 | Himoto et al. | |
| 6,527,637 B2 | 3/2003 | Fujioka et al. | |
| 6,544,126 B2 | 4/2003 | Sawano et al. | |
| 6,626,760 B1 | 9/2003 | Miyamoto et al. | |
| 6,697,074 B2 | 2/2004 | Parikh et al. | |
| 2001/0039212 A1 | 11/2001 | Sawano et al. | |
| 2002/0026424 A1 | 2/2002 | Akashi | |
| 2002/0028710 A1 | 3/2002 | Ishihara et al. | |
| 2002/0141577 A1 | 10/2002 | Ripley et al. | |
| 2002/0165028 A1 * | 11/2002 | Miyamoto et al. | 463/46 |
| 2003/0048718 A1 | 3/2003 | Watanabe et al. | |
| 2003/0050116 A1 | 3/2003 | Chen | |
| 2003/0216177 A1 | 11/2003 | Aonuma et al. | |
| 2004/0053691 A1 | 3/2004 | Kawase | |

\* cited by examiner

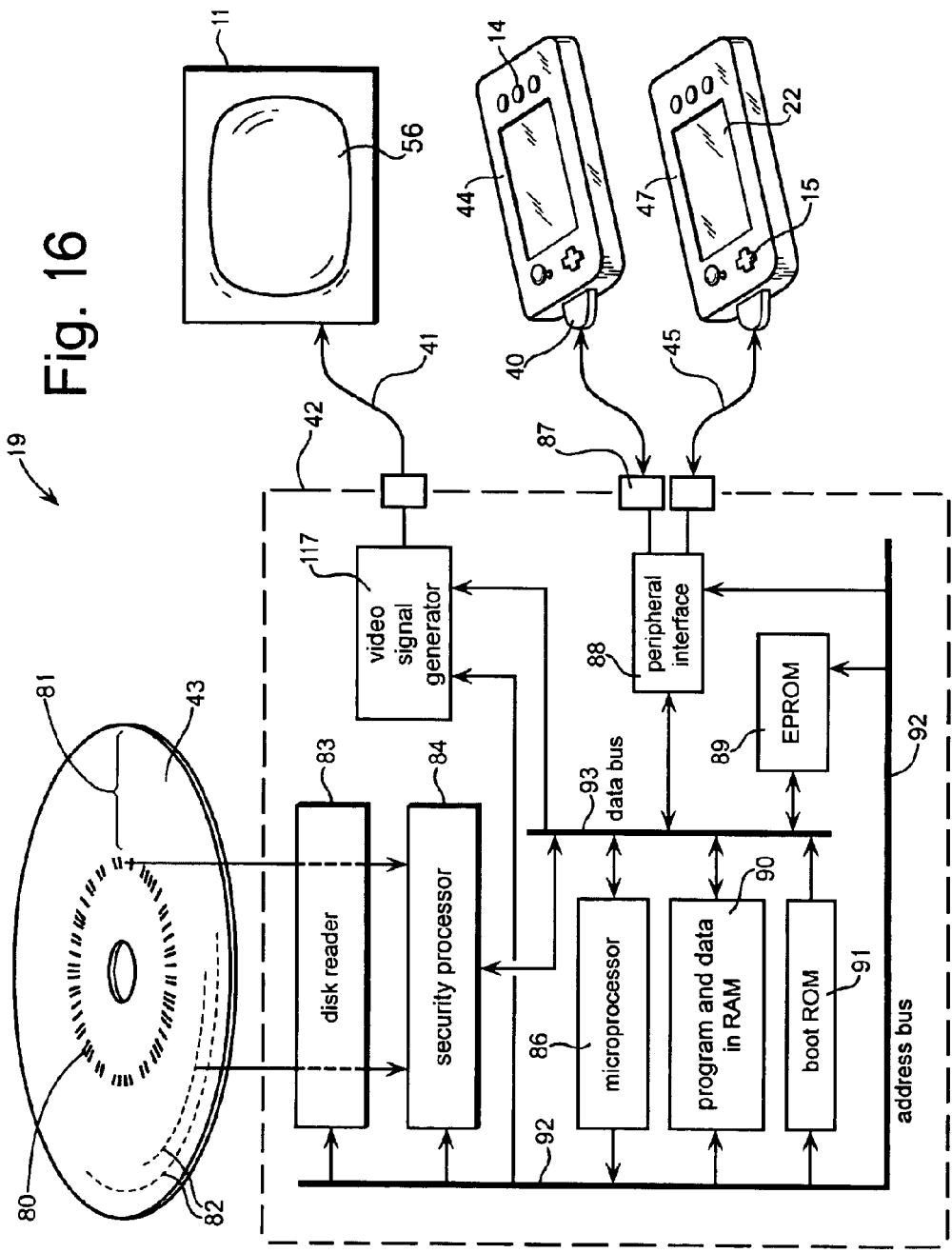

Fig. 19

| control unit ID number | operation code | picture serial number | size factor | coordinate $X_1$ number of pixels | coordinate $Y_1$ number of pixels | coordinate $X_2$ number of pixels | coordinate $Y_2$ number of pixels | object id3 |
|---|---|---|---|---|---|---|---|---|

| |
|---|
| program for loading RAM with programs supplied by console and disk |
| program for converting manual inputs into numbers in memory |
| program for processing picture data records from console |
| program for sending location data records to console |
| program for converting cursor movement into location coordinates |
| program for displaying a picture on LCD |
| program for generating a miniature likeless from picture data |
| program for generating a preview picture from picture data |
| program for converting touchscreen measurements to location data |
| program for converting touchpad measurements to location data |
| program for superimposing an object picture on a full LCD picture |
| program for animating a character |
| program for displaying maps and other non-animated pictures |
| |
| data for character descriptions (polygons, textures, etc) |
| data for terrain descriptions (polygons, textures, etc) |
| data for maps, word menus, etc. |

LINKED ELECTRONIC GAME SYSTEMS

CROSS-REFERENCE TO RELATED APPLICATIONS

This is a divisional of the parent application Ser. No. 09/853,487, filed May 10, 2001.

FIELD OF THE INVENTION

This invention relates generally to electronic video game systems and more particularly to electronic video game systems that have hand-held control units with liquid-crystal display (LCD) screens.

BACKGROUND-DISCUSSION OF PRIOR ART

Video game console systems, hand-held control units, and hand-held electronic games having liquid crystal display (LCD) screens are well known and are described in U.S. Pat. No. 5,393,073. It is also known to distribute video games on plastic discs on which encrypted information has been written for verifying authenticity. It is also known to use touch-sensitive screens and pads, in addition to or in place of a mouse, for entering information into hand-held computers. It is also known to use analog joysticks to manipulate movement of player controlled characters in simulated 3-dimensional space (see U.S. Pat. No. 6,139,433) on a TV-screen.

In a video game in which two or more human players control their respective player-controlled characters on a TV-screen using hand-held controllers with LCD screens (see my U.S. Pat. No. 5,358,259), a problem arises as to how each human player can signal to the game console (the game system's main computer) what the player wants his/her character to do, other than using push buttons to control simple actions such as running, jumping, hitting, shooting, etc. In a multi-player game, some of the selected and rejected actions for a player's character should not be seen on the TV screen by other players. A human player can indicate his/her wants by making a selection on a hand-held menu of words, but this is not very natural.

Patent application GB 2,353,928A discloses a game system having a console connected to multiple hand-held game machines with LCD's that display maps including squares to indicate player-controlled characters, circles to indicate monsters, and diamonds to indicate items. Although this patent maintains that these maps are pictures, the patent does not provide any examples of pictures of animated characters with hands, arms, legs, faces, and clothing for display on hand-held control units.

Therefore, a need has arisen for hand-held controllers that display more natural visual formation such as pictures, especially pictures of characters, that enable players to control their TV-screen characters more naturally than with prior-art controllers.

SUMMARY OF THE INVENTION

An embodiment of this invention is a video game system that includes a console unit and hand-held control units. The console unit generates animated pictures for display on a television (TV) screen. Each hand-held control unit includes an LCD screen that displays pictures, maps, words, and numbers. The pictures may be still pictures and/or animated pictures. During parts of the game, each control unit may directly control animated characters that are displayed on the TV screen, and at other times the LCD screens can display pictures of scenes and animated characters that are different from the scenes and characters displayed on the TV screen. Each control unit may operate for awhile as a personal game unit while remaining in coordination with the console game unit that may be generating pictures of the same scene or a different scene for display on the TV screen. Pictures displayed on a control unit LCD screen may appear concurrently or later on a TV screen.

Simulated objects and characters are displayed on the LCD screen in a natural pictorial setting and can be selected, moved, constructed, changed, or deleted by a player without revealing to other players these objects of interest or their disposition. In the preferred embodiment, hand-held control units have touchscreens so that players can point to objects and characters on the LCD screen without always using cursors or push button. The video game system in general will provide a unified game experience in which hand-held controllers do more than just control a console game, but also do more than just a stand-alone hand-held game.

Each game operates in a simulated world populated with animated characters and static objects which are displayed on the screen of the TV set, and are also displayed on the LCD screens of hand-held controllers. While one part of the simulated world is displayed on the TV screen, different parts of the simulated world may appear on the LCD screens of player's hand-held control units. Alternatively, some of the pictures displayed on LCD screens and TV screens may represent the same part of the simulated world at different times, or different parts at the same time.

In a war game for example, while a first player is controlling a soldier fighting a skirmish in one part of the simulated world that appears on the first player's LCD screen, a second player may be controlling a different character building a fortification in a different part of the simulated world and this building scene appears on the second player's LCD screen, while a third part of the simulated world appears on the TV screen, in this example. Alternatively, the skirmish may appear on the TV screen while the second player's attention is focused on the building scene displayed on his/her control unit. Later the TV screen may display the fortification that was secretly built by the second player's character, perhaps to the surprise of the first player.

ADVANTAGES

By displaying pictures on an LCD screen for each player, alternative dispositions of objects and characters in the game are presented to players in a natural setting, unlike menus of words or symbols representing characters. This reduces clutter on the TV screen which might otherwise reveal to other players unfinished work or hidden alternatives. Natural pictures on an LCD screen will provide quicker and more accurate recognition and selection of locations, directions, orientation, and actions of game characters before they appear on the TV screen.

OBJECTIVES

An object of this invention is to make role-playing video games more fin for players by providing alternative choices for each player in personalized natural pictures on control units so that the main TV picture does not reveal players' confidential alternatives or selections.

BRIEF DESCRIPTION OF THE DRAWINGS

FIG. 16 is a block diagram of an exemplary video game system having two hand-held control units.

FIG. 19 is a record format indicating various data fields in a location data record.

FIG. 20 is a memory map of various programs stored in a hand-held control unit.

DETAILED DESCRIPTION OF EXEMPLARY EMBODIMENTS

Figure 8:
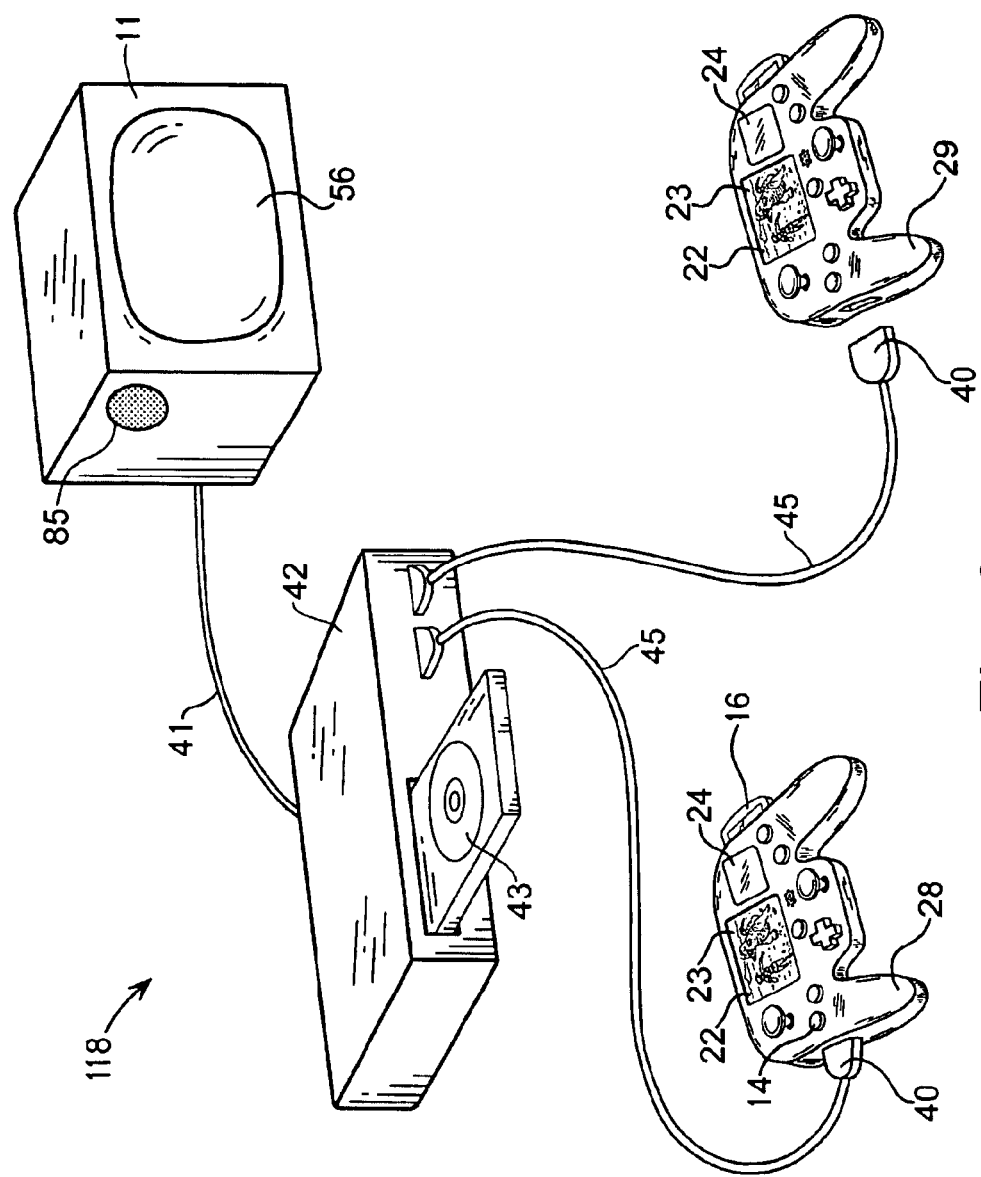
FIG. 8 is an isometric view of an exemplary video game system using two of the FIG. 3 control units.

FIG. 8 shows an exemplary embodiment of a video game system 118 on which the video games of the present invention may be played. Video game system console 42 generates a video signal on cable 41 connected to TV set 11, for display on TV screen 56 or on a video monitor (not shown) or similar common display seen by other players. Console 42 is also connected to one or more hand-held control units 28 and 29 or other user input devices by cables 45 or a wireless equivalent (not shown in FIG. 8) such as infrared, ultrasonic, RF waves, or other data communicating forms of energy. Console 42 is detailed in FIG. 16 which shows an optical disk reader 83 for reading optical disks 43 in which tracks 82 of digital information, including game programs and data, are pressed and molded by a disk manufacturer.

Figure 3:
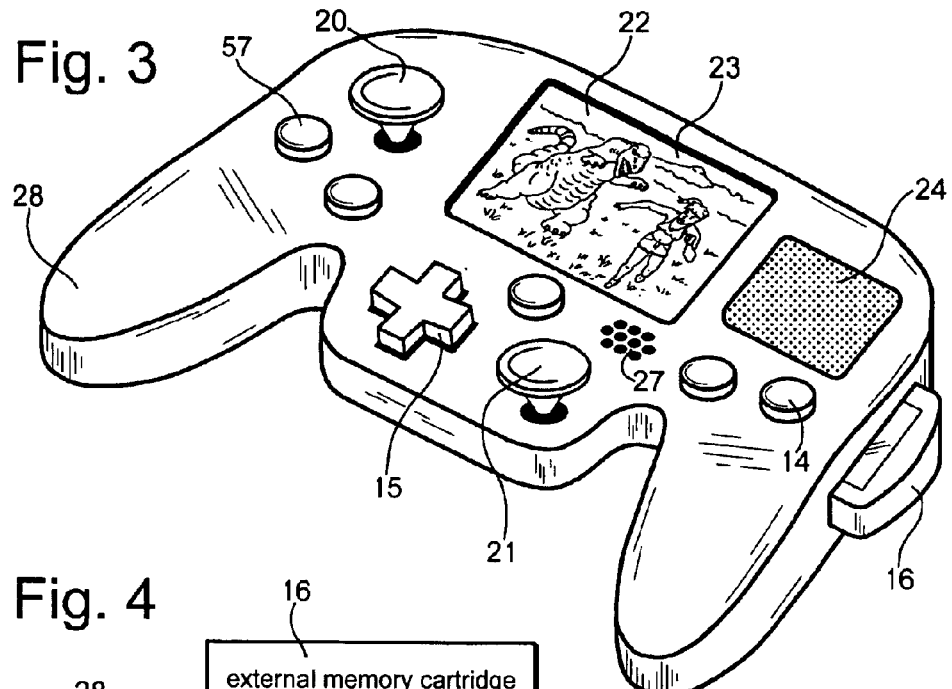
FIG. 3 is an external isometric view of an exemplary hand-held control unit including an LCD screen and touch-sensitive pad.

The improved control units 28 and 29 shown in FIG. 8 and FIG. 3 (control unit 29 is the same design as unit 28) include features not included in control units 44 and 47 shown in other drawings. This is done for clarity in the drawings and does not imply that any one control unit design is more or less suitable for the present invention, except where additional hardware features of control units 28 and 29, such as touch pad 24 and touch screen 23, are required for use in video games that make use of those hardware features.

Figure 1:
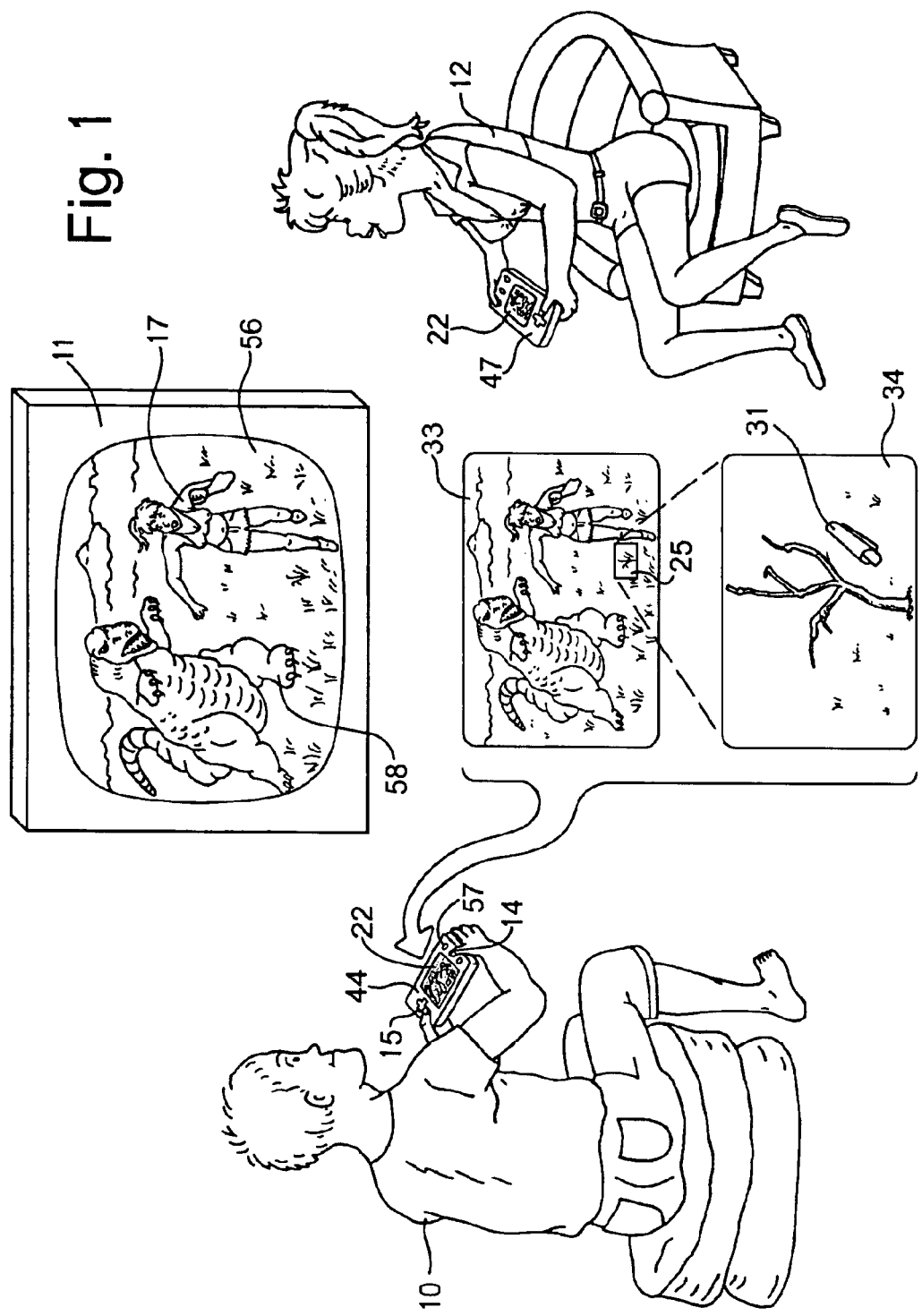
FIG. 1 shows an exemplary game playing session in which two human game players hold game control units having LCD screens on which are displayed miniature copies or likenesses of large pictures displayed on the screen of a television set.

FIG. 1 illustrates an exemplary game playing session in which two human game players 10 and 12 hold game control units 44 and 47 having LCD screens on which are displayed pictures, verbal expressions, and/or other visual images. Whenever a human player 10 presses push-button (button-switch) 14, his hand-held control unit 44 generates on his LCD screen a miniature copy 33 of the large picture displayed on TV screen 56, generated either from data already stored in control unit 44, or from data transmitted from console 42 (FIG. 16) in response to a signal initiated by manually pressing button 14. Miniature picture 33 may be a freeze-frame, or animated in sync with the TV picture at various display rates, or animated in slow or accelerated motion.

After miniature picture 33 is displayed on the LCD screen of control unit 44, one or more areas 25 of the LCD screen may blink or change color or brightness or otherwise highlight or indicate areas of possible interest to player 10. Player 10 may select a simulated object or area in picture 33 for further study by using cross-switch 15 to position a cursor, highlight, or other visual indicator to an LCD screen location corresponding to the indicated area 25. Player 10 then selects the object or indicated location by pressing selection push-button 57, which may cause the indicated area 25 to be enlarged on the LCD screen as picture 34 so that an object 31 that was previously invisible or too small to see on the LCD screen is made visible. Player 10 may then repeat the process by selecting object 31 which may be a written clue (with words that appear on control unit 44) or a weapon to keep for future action, or other selectable objects. When objects are highlighted or enlarged on unit 44, they typically are not highlighted or enlarged on TV screen 56 so that other human players such as player 12 will not see which objects have been selected on unit 44.

Alternatively, player 10, who does not normally control the dinosaur, may select the dinosaur's foot 58 that is blinking or otherwise indicated on the LCD screen of control unit 44. When player 10 positions a cursor or other location indicator on foot 58 and presses selection button 57, the action sequence of digitally generated pictures being displayed on TV screen 56 may, for example, cut to an alternative action sequence showing the dinosaur stumbling and falling accompanied by sounds of the dinosaur hitting the ground and screaming in pain and anger, thereby allowing character 17 to escape from the dinosaur.

During the time that player 10 is pressing cross-switch 15 and buttons 14 and 57, the action sequence showing the dinosaur chasing character 17 will continue and may reach a different branch point in the branching structure of action sequences that makes player 10's selections moot. For example, player 12 may be making alternative choices that display different objects of interest on her control unit 47 and she may select different branches in the branching structure of action sequences that display alternative actions of character 17 or the dinosaur, or alternative scenes and characters.

Role-playing video games that make use of this invention will typically promote both cooperation and competition between game players. The exemplary game may promote cooperation between players 10 and 12 in trying to stop the dinosaur from attacking character 17, but the game may also create competition between players 10 and 12, both of whom may want to be first to rescue character 17.

In many embodiments, miniature picture 33 is a freeze frame so that human player 10 may select an object 25 on the LCD screen before the object moves off screen.

Figure 2:
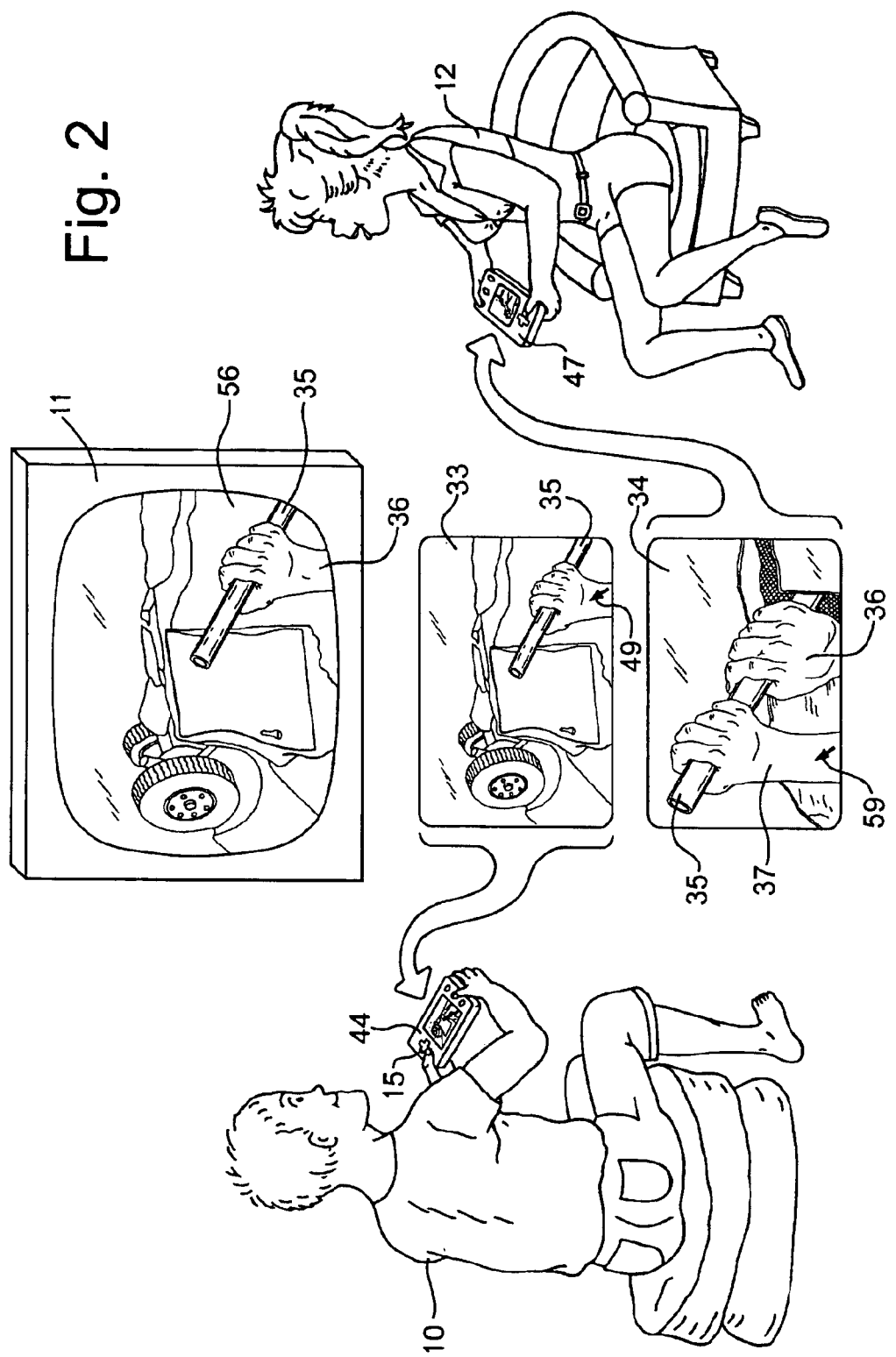
FIG. 2 shows an exemplary game playing session in which two human game players hold game control units having LCD screens on which are displayed respectively a miniature copy or likeness of the large TV picture and a miniature preview picture of a later scene.

FIG. 2 illustrates an exemplary game playing session in which human player 10 has selected the miniature picture option described above with reference to FIG. 1 and has positioned cursor 49 onto the hand 36 of his player controlled character. The cursor appears only on miniature picture 33 and not on TV screen 56. Player 10 has selected on his control unit 44 a hand-control mode in which he can control 3-dimensional movement of the hand of his player-controlled character. In the preferred control unit design shown in FIG. 3, hand-held control unit 28 includes at least one analog joystick 20 or 21 by which player 10 in FIG. 2 may control 3-dimensional movement of his player-controlled character's right hand 36 or other selected body part. Details of a 2-shaft analog joystick to control motions of a player controlled character in 3-dimensions are disclosed in U.S. Pat. No. 6,186,896.

In the exemplary game illustrated in FIG. 2, player 10 has used cross-switch 15 to position his player character's right hand 36 to grasp steel pipe 35 for use as a prybar to open the door of a wrecked car shown in miniature picture 33 on the LCD screen of control unit 44. When player 10 selects this option, his control unit 44 sends a data record (FIG. 19) to console 42 (FIG. 8) requesting a hand-grasping action sequence, and console 42 responds by generating a video frame sequence combining rendered polygons of moving hand 36 superimposed on the wrecked car background. Console 42 also generates a video signal for the generated frame sequence for display on TV screen 56 so that the other player 12 may see the hand-grasping action.

Simultaneously, control unit 44 generates an equivalent sequence of miniature animated pictures of moving hand 36 superimposed on the same wrecked car background on the LCD screen of control unit 44. After the sequence of miniature animated pictures 33 and the frame sequence of video pictures shown on TV screen 56 begin, both sequences continue and remain substantially in sync, although perhaps at a different display rate, until player 10 selects other images for viewing on his control unit 44, or another player 12 alters the moving picture sequence on TV screen 56. The moving pictures on TV screen 56 of hand 36 grasping pipe 35 are visible to other human player 12 with no indication on TV screen 56 that any cursor control was used to cause the hand-grasping action sequence.

Human player 12 has selected (as will be explained below with reference to FIG. 15) an action from a picture menu (FIG. 15 or 15a) of alternative actions displayed on her control unit 47. This selected action enables player 12 to position her cursor 59 (FIG. 2) on the right hand 37 of her player-controlled character to add her character's simulated pulling force to pipe 35. When player 12 selects an action from a picture menu, her control unit 47 displays a miniature preview picture 34 on the LCD of her control unit 47 showing what will happen if she implements her selected action.

To accomplish this, her control unit 47 generates and displays an action sequence showing two hands 59 and 36 successfully pulling on pipe 35. This preview sequence can be generated in simplified, low-resolution, fast-motion form, to give player 12 a quick preview of the selected (but not yet implemented) action sequence that will appear on TV screen 56 if she implements it.

In the exemplary FIG. 2 game, if player 12 implements the selected action by pressing on an appropriate pushbutton, her control unit 47 sends a selection data record (FIG. 19) to console 42 (FIG. 8) which generates the frame sequence being displayed on TV screen 56 and will, for example, generate a modified frame sequence showing her player-controlled character's right hand 37 grasping pipe 35 beside the other character's right hand 36 followed by a picture sequence showing both player-controlled characters prying open the wrecked car door and rescuing a non-player character (not shown) in the wrecked car.

Likewise in FIG. 1, player 10 may rerun prior scene 34 on LCD 22 so that he may make use of clue 31 or pickup tools he neglected earlier. Button-switches 14 may provide rewind, normal speed, and fast forward control of pictures displayed on LCD 22 for manual selection of objects and clues from prior scenes.

FIG. 3 shows an improved hand-held control unit 28 which overcomes some of the difficulties a player might have selecting actions and objects on an LCD screen using only cross-switch 15 and push-buttons 14 and 57 on the hand-held control units 44 and 47 illustrated in FIG. 1 and FIG. 2. The exemplary FIG. 3 control unit includes cross-switch 15, two analog joysticks 20 and 21, push-buttons 57, 14 and other buttons, speaker 27, external memory cartridge 16, touch-sensitive pad 24, and LCD 22 covered with transparent touchscreen 23 (shown in FIG. 4).

Touchpad 24 and touchscreen 23 are sensitive to finger pressure and can measure the approximate location of a finger on X-Y coordinates as described below with reference to FIG. 11. Transparent touchscreen technology is described in U.S. Pat. No. 6,163,313. In FIG. 3 herein, both touchpad 24 and touchscreen 23 are specified for control unit 28 so that a player can use fingers of both hands to maneuver virtual objects in 3-dimensional space on LCD screen 22. A player can select an object on touchscreen 23 with one finger, and while holding his finger steadily on the object, use another finger on touchpad 24 to rotate the object into the desired position. Touchpad 24 and touchscreen 23 can also act as push-buttons by accepting a finger tap, for example, of a few hundred milliseconds as a selection indicator.

Figure 4:
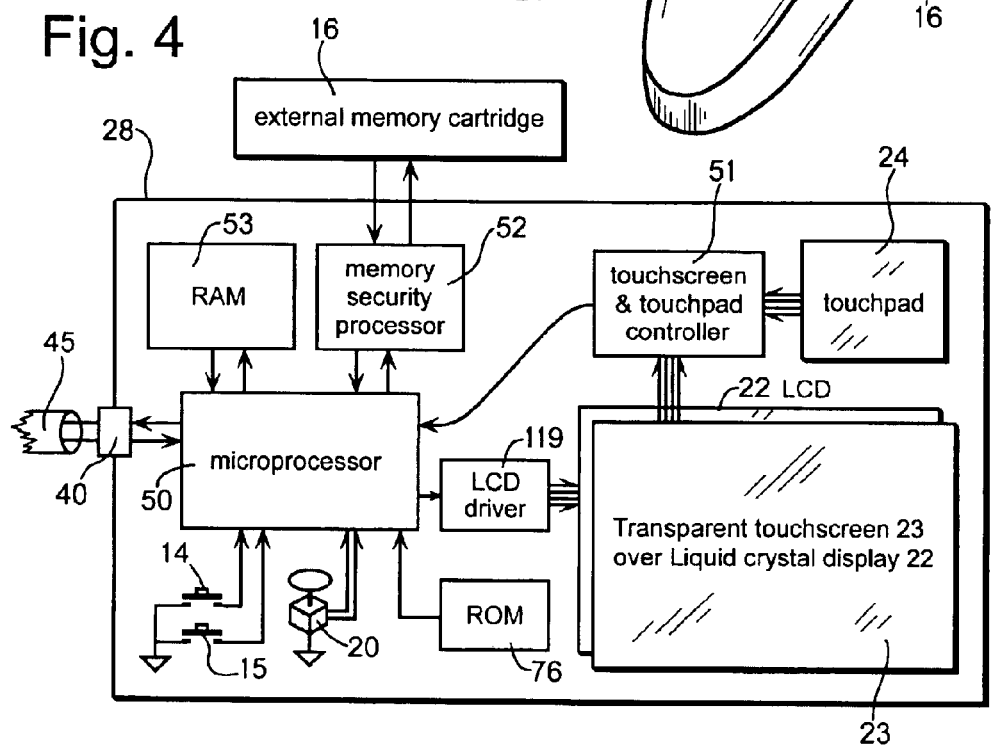
FIG. 4 is a block diagram of the FIG. 3 control unit.

FIG. 4 is a block diagram of the FIG. 3 control unit 28 which connects to console 42 through connector 40 and cable 45 or wireless equivalent. Control unit 28 which is only schematically represented in FIG. 4 includes touchscreen 23, touchpad 24, and controller processor 51 for determining finger locations on touchscreen 23 and touchpad 24. Processor 51 outputs X and Y coordinates to processor 50 which generates all pictures and text that appear on LCD 22 via LCD driver 119, and generates data records (FIG. 19) that processor 50 sends to console 42. Processor 50 also interprets all data records received from console 42 including records containing data from which processor generates pictures for display on LCD 22. Memory security processor 52 controls all data passing between processor 50 and external memory cartridge 16 to verify authenticity of cartridge 16. Memory cartridge security processors are disclosed in U.S. Pat. No. 6,190,257. Memory cartridge 16 is typically used when control unit 28 is used as a stand-alone hand-held game system.

When electric power to control unit 28 is turned on, boot ROM 76 provides an initial program of instructions, including some programs listed in FIG. 20. Additional programs are loaded into RAM 53 and are supplied by console 42 which reads these control unit programs from disk 43. See further discussion of these programs below with reference to FIGS. 19, 20, and 21.

Control unit 28 may include various other features such as an operating system in ROM 76, a ROM and battery-maintained RAM in external memory cartridge 16, a data bus, an address bus, input/output processor, image processing unit, communication control unit, power source, circuit board, and other customary components.

Figure 5:
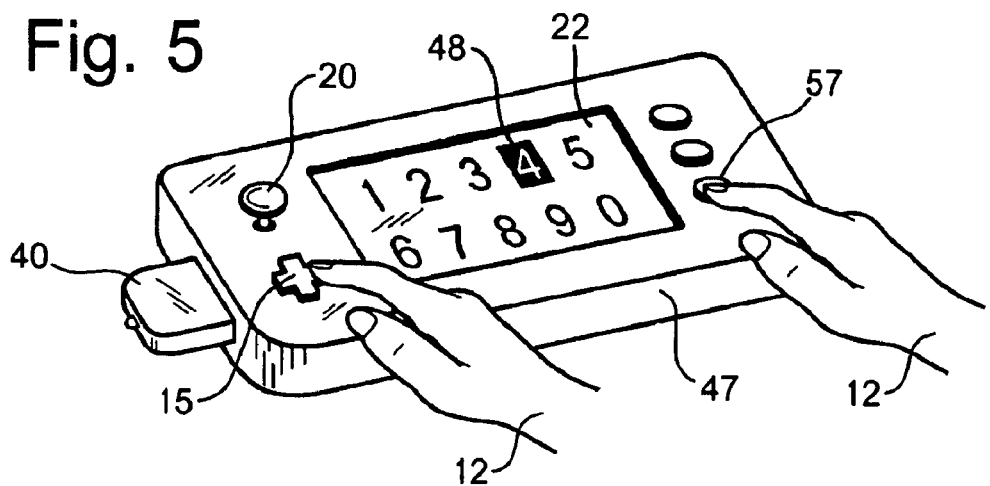
FIG. 5 is an isometric view of a hand-held control unit illustrating manual selection of numbers by using a cross-switch and a push-button.

FIG. 5 illustrates a slow method of entering numbers, without using a keyboard, by pressing cross-switch 15 repeatedly to move highlight cursor 48 horizontally and vertically on LCD screen 22 until a desired digit is highlighted. Pressing button 57 enters the selected digit. After all digits have been entered, button 57 is pressed again to enter the multi-digit number. This method is often too slow for games that require entering numbers, such as map coordinates for war games. Using analog joystick 20 is typically faster but less accurate, because pressing the joystick a little too far causes the highlight cursor to overshoot the desired digit.

Figure 6:
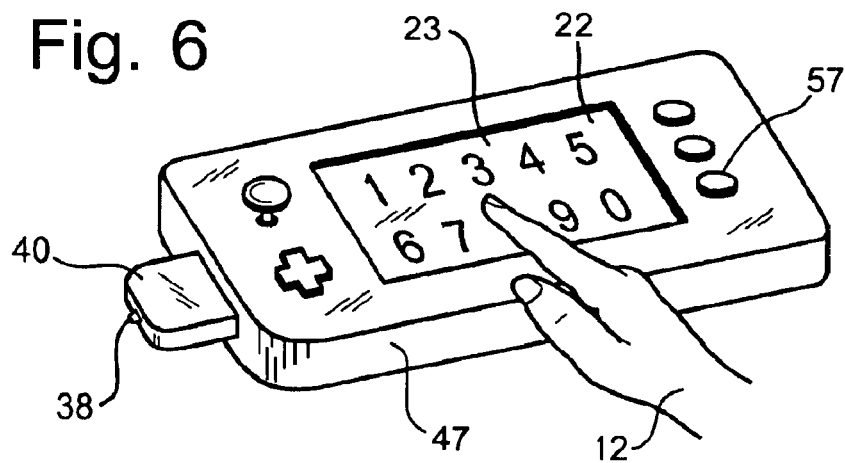
FIG. 6 is an isometric view of a hand-held control unit with a touch-sensitive LCD screen illustrating manual selection of numbers.

FIG. 6 illustrates a faster method of entering digits using touchscreen 23 overlaying LCD 22. After selecting a series of digits by touching the digits, button 57 is pressed only once to enter the multi-digit number. For games that are downloaded from the Internet after payment by credit card, the touchscreen method illustrated in FIG. 6, for entering credit card numbers, is the preferred method, because entry of such numbers can be easily kept hidden from other people when entered on a hand-held control unit. Connector 40 for communications between control unit 47 and game console 42 may be connected to wires in cable 45, or an RF transceiver, or a transceiver using infrared photodiodes 38.

Figure 7:
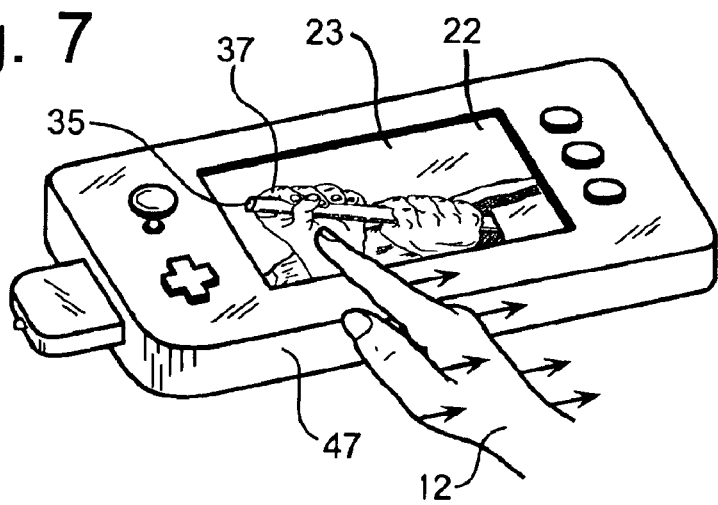
FIG. 7 is an isometric view of a hand-held control unit with a touch-sensitive LCD screen illustrating manually controlled movement of a selected picture object.

FIG. 7 illustrates use of touchscreen 23 to replace the cursor control described above with reference to FIG. 2. Instead of using cross-switch 15 in FIG. 2 to position cursor 49 on hand 36 or cursor 59 on hand 37, the preferred method in FIG. 7 is for human player 12 to touch her finger to touchscreen 23 overlying the LCD image of hand 37 and slide her finger across touchscreen 23 to a new location over pipe 35 to cause corresponding movement of hand 37 grasping pipe 35. Touchscreen 23 signals the finger location to controller 51 (FIG. 4), which converts the location to physical X,Y coordinates, which processor 50 uses to calculate a new LCD location for displaying hand 37. Thus simulated hand 37 will follow the player's moving finger on the touchscreen without any need for a cursor. The image of hand 37 substitutes for a cursor. When the location of hand 37 is within preprogrammed coordinates for pipe 35, processor 50 (FIG. 4) recomputes the pixels representing hand 37 in successive frames, so that the hand appears to grasp and move pipe 35 displayed on the LCD. See further discussion below with reference to FIG. 11.

Processor 50 also sends a series of data records to console 42 selecting a branch in the branching structure of alternative sequences of hand movements, showing hand 37 moving to the location of pipe 35, rotating to a new angle facing pipe 35, and grasping pipe 35, the image of which is separately generated with the corresponding size and orientation. Microprocessor 86 (FIG. 16) or graphics coprocessor (not shown) in console 42 then generates the corresponding sequence of rendered polygons for hand 37 and pipe 35 for including in the video frame sequence. With this FIG. 7 method, players can use their hand-held controllers to indicate movement of objects to new locations in 3-dimensions and indicate actions to be performed which are then typically generated as composite video by generator 117 (FIG. 16) and appear on TV screen 56 for both players 10 and 12 to see.

FIG. 8 shows an exemplary video game system 118 in general which includes two of the improved control units 28 and 29 as described above with reference to FIG. 3.

Figure 9:
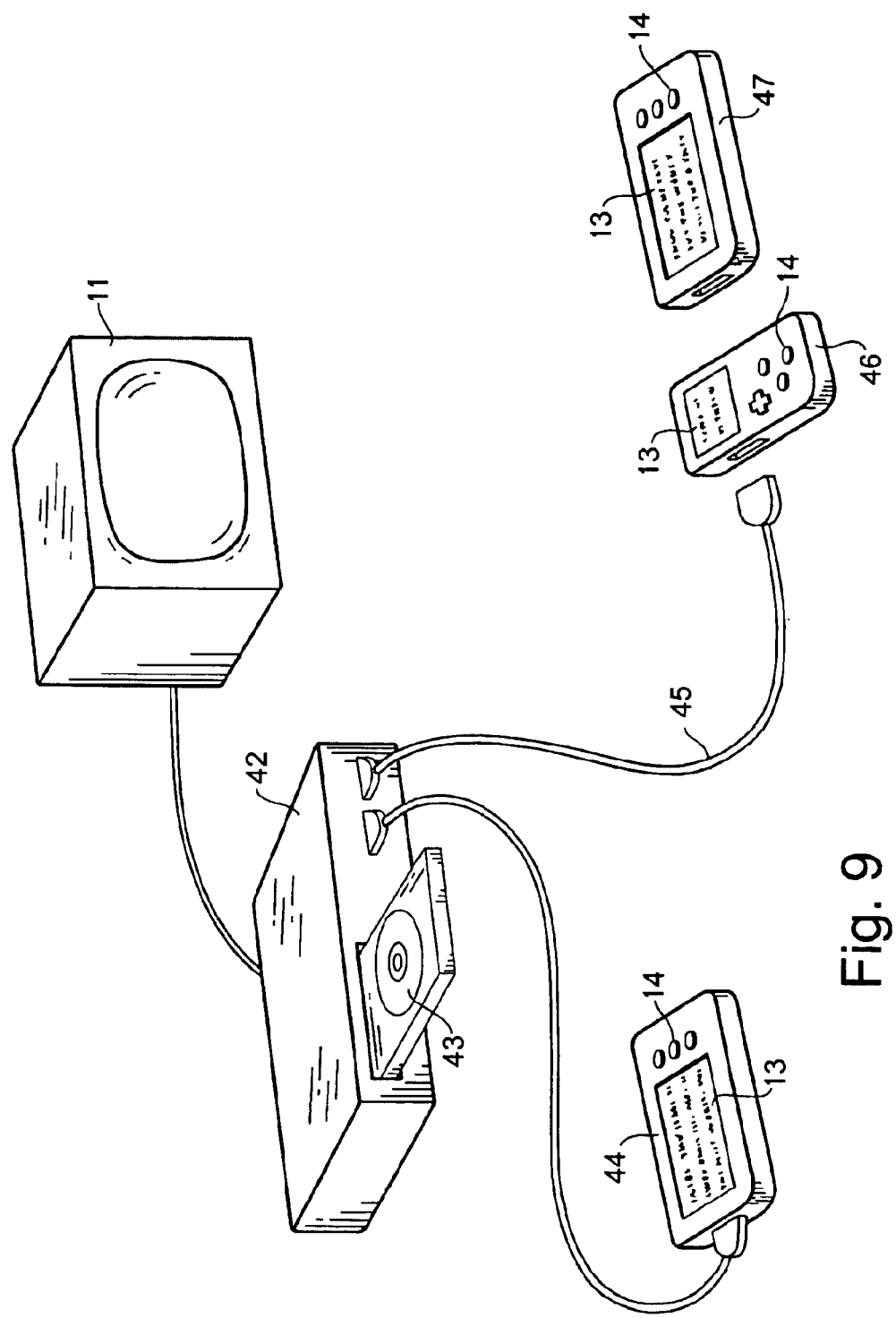
FIG. 9 is an isometric view of a prior-art video game system from FIG. 9 in U.S. Pat. No. 5,358,259.

Prior-art hardware shown in FIG. 9 (from my U.S. Pat. No. 5,358,259) is included herein for comparison with FIG. 8. LCD screens, 22 are illustrated in FIG. 8 showing pictures, in contrast with FIG. 9 LCD screens 13 which show menus of verbal expressions. For clarity, other differences in hardware, software, and methods are not all shown in FIGS. 8 and 9.

Figure 10:
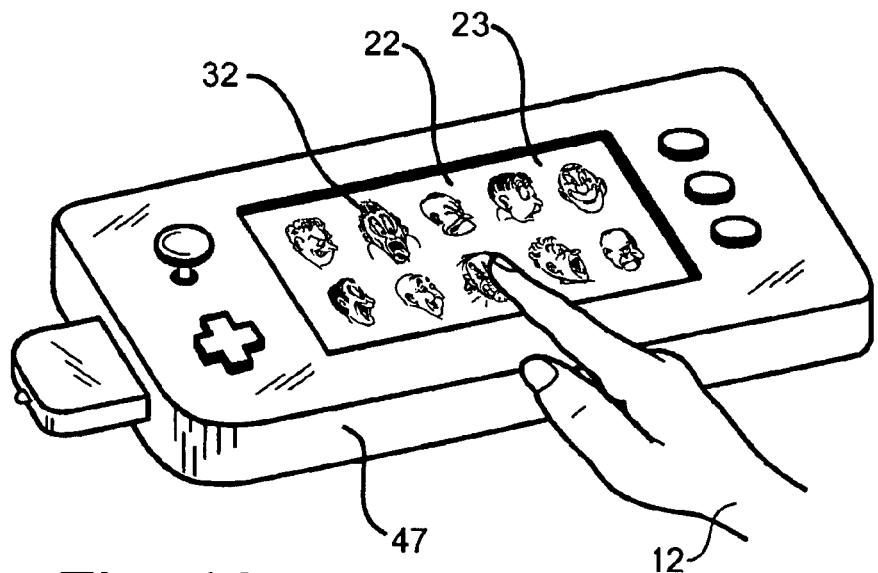
FIG. 10 is an isometric view of a hand-held control unit with a touch-sensitive LCD screen illustrating manual selection of character emotions.

FIG. 10 shows a control unit 47 with touchscreen 23 and a picture menu of emotional faces. By touching one face 32, human player 12 can select the desired emotion or mood of a player-controlled character.

Figure 11:
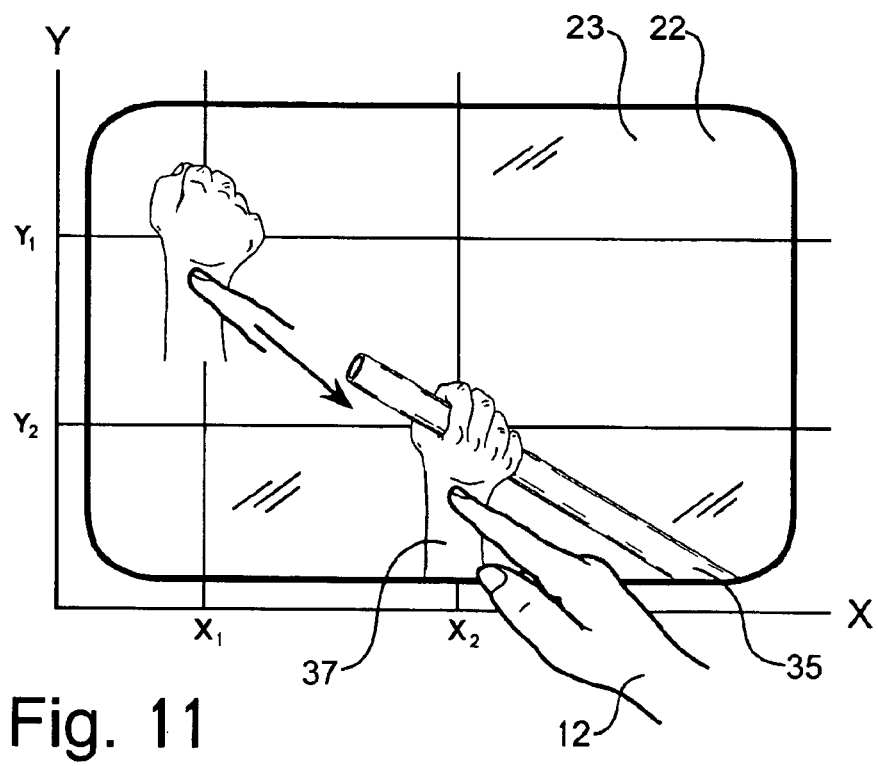
FIG. 11 is a touch-sensitive LCD screen with cartesian coordinates superimposed to illustrate selection and movement of simulated objects in two dimensions on an LCD picture.

FIG. 11 illustrates manual use of touchscreen 23 with X,Y coordinates for indicating a two-dimensional location on the underlying LCD screen 22 (FIG. 4). FIG. 11 shows hand 37 shaped as a fist and located at coordinates $(X_1\ Y_1)$. When human player 12 places her finger over the image of hand 37 on touchscreen 23 and moves her finger on touchscreen 23 in the direction of the arrow to location $(X_2\ Y_2)$—the hand image on LCD 22 follows her finger as described above with reference to FIG. 7. Pipe 35 intersects coordinates $(X_2\ Y_2)$ and hence when hand 37 intersects pipe 35 at coordinates $(X_2\ Y_2)$ the program being executed in microprocessor 50 in control unit 47 interprets this collision as a command to show hand 37 grasping whatever object is at coordinates $(X_2\ Y_2)$—in this example pipe 35. The polygons which form the image of hand 37 on LCD 22 are then modified by microprocessor 50 (FIG. 4) to show hand 37 grasping pipe 35 on LCD 22. If player 12 implements this action, microprocessor 50 sends data to console 42 where microprocessor 86 (FIG. 16) modifies corresponding polygons which form the image of hand 37 in the generated video images displayed on TV 11 (FIG. 16). Hence, when touchscreen 23 is used to move an object in the picture on LCD 22 from one LCD location to another location, the resulting action appears on both the LCD 22 and TV screen 56.

The X,Y coordinates in FIG. 11 may be denominated in pixels or millimeters and refer to the visible area of LCD screen 22 and corresponding area of touchscreen 23. Since the picture on LCD 22 is a two-dimensional picture, there is no Z coordinate, although Z may represent a non-spatial variable such as finger pressure. The X,Y coordinates on LCD screen 22 should not be confused with simulated coordinates X,Y,Z in a simulated 3-dimensional world populated with animated characters, a world in which Z represents height.

Figure 12:
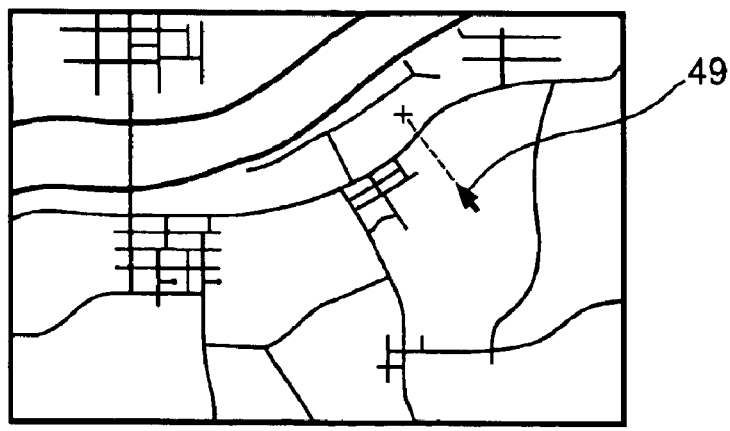
FIG. 12 is a map on an LCD screen to illustrate manual selection of a line segment defined by a pair of 2-dimensional locations on the map.
Figure 13:
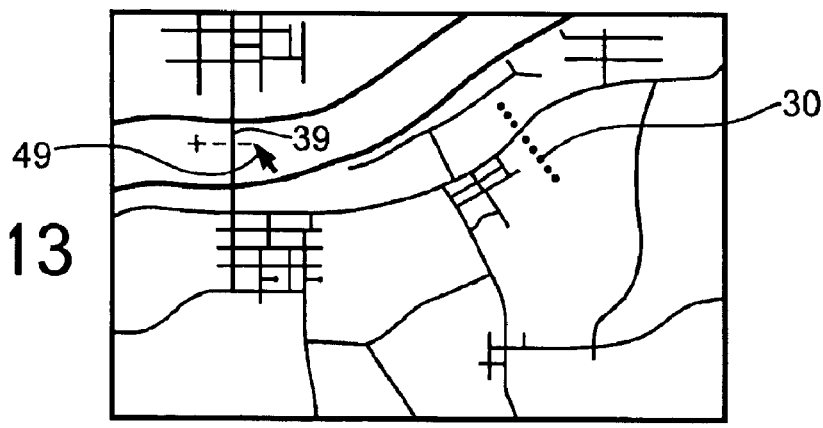
FIG. 13 is a map on an LCD screen to illustrate a line of soldiers in a war game.

FIG. 12 illustrates another use of cursor control in a war game where a first human player uses touchpad 24 (FIG. 3) to control cursor 49 on hand-held control unit 28 (FIG. 3). He first uses touchpad 24 to position cursor 49 at a map location indicated by the + sign. Then he presses button 14 (FIG. 3) to define the starting point of a line of defense. Then using touchpad 24 to position cursor 49 as shown in FIG. 12, he presses button 14 again to define the end point of the defense line. Control unit 28 then displays a line of dots 30 in FIG. 13 representing a line of soldiers. The first player can also indicate building a barrier across bridge 39 (FIG. 13) using cursor 49 (FIG. 13). Since these tactical moves are displayed only on the first player's control unit, the line of soldiers and the bridge barrier are secret from a second player or players who may falsely assume that the soldiers are deployed elsewhere and bridge 39 is open. If the first player displays the map later, the same line of soldiers 30 and barrier on bridge 39 will continue to appear on the LCD screen of the first player's control unit, but will not be displayed on corresponding maps displayed on control units held by other players.

Figure 14:
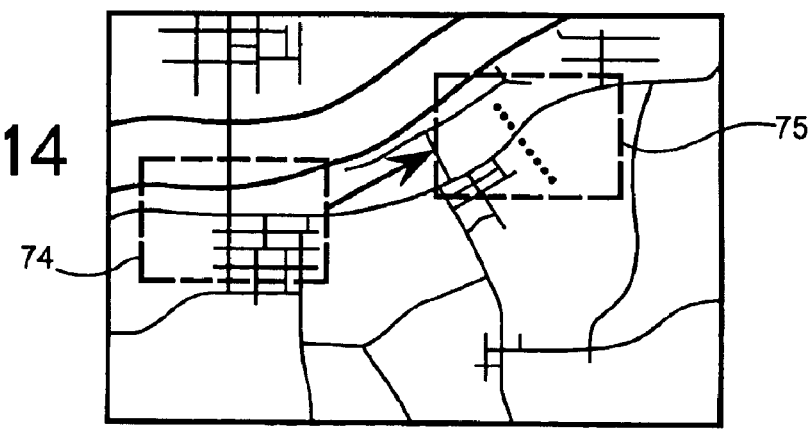
FIG. 14 is a map on an LCD screen to illustrate creation of a simulated barrier on a bridge in a war game.

FIG. 14 illustrates a map with a limited display area 74 that can be scrolled in various directions by using cross-switch 15 to display a different area of the map such as display area 75 which may show greater detail than FIG. 13 on the same size LCD 22. Moving a finger on touchpad 24 or touchscreen 23 may be used in lieu of cross-switch 15 to relocate the display area on a map.

Thus control units with touchpads 24 and LCD screens 22 as illustrated in FIG. 3 are very useful to control a video war game where the battles are displayed on TV screen 56 (FIG. 2) for all players to see, but where tactical moves are planned and executed in secret on hand-held control units. Performing the same functions with cross-switch 15 on control unit 44 as in FIG. 2 would typically be less natural, more difficult, and slow.

Figure 15:
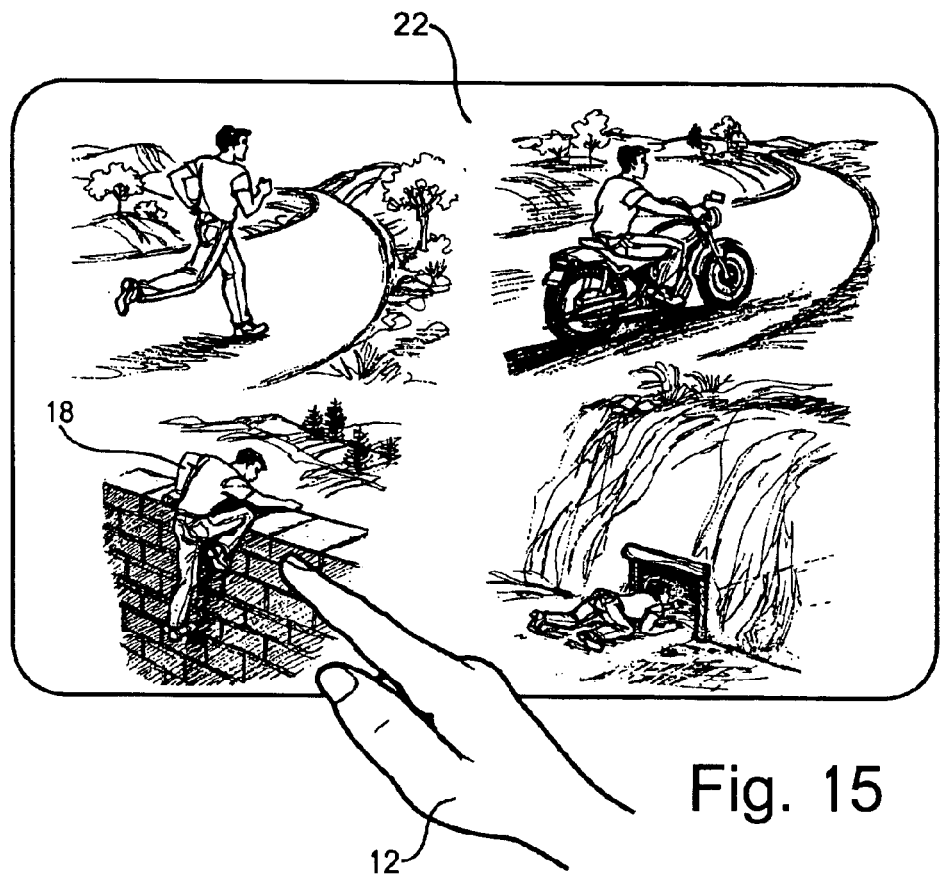
FIG. 15 is a touch-sensitive LCD screen illustrating manual selection of an action to be performed by a game character from four alternative actions.

FIG. 15 illustrates a menu of alternative actions which appears on LCD screen 22 awaiting selection by human player 12. LCD screen 22 is overlaid by touchscreen 23 (FIG. 4) so that the next action for character 18 to perform among these four alternative actions is selected by player 12 touching the touchscreen 23. Character 18 in each of the four action pictures may be the same character, a player controlled character who is controlled by player 12. When player 12 touches one of the four touchscreen areas corresponding to the four pictures in FIG. 15, control unit 28 (FIG. 8) or 47 (FIG. 1) generates data indicating which of the four corresponding locations is selected. Console 42 (FIG. 8) then begins one of the four possible action sequences selectable at the current branch point, i.e. one of the four preprogrammed actions. For control units that have LCD 22 but not touchscreen 23, the procedure described above with reference to FIG. 5 using a cross-switch may be used instead of a touchscreen.

Figure 15A:
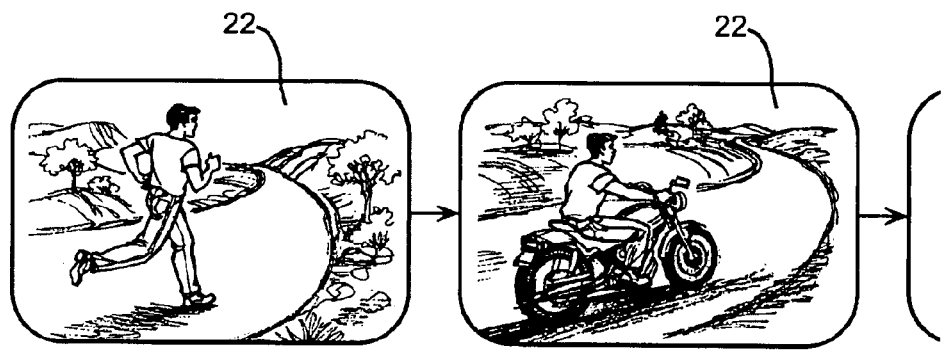
FIG. 15a is a series of LCD pictures for manual selection of an action to be performed by a game character from more than two alternative actions.

FIG. 15a illustrates a menu of alternative actions which appear on LCD screen 22 as a series of pictures, each picture representing one alternative action for the character to perform. In this example there is no touchscreen 23 overlaying LCD 22 and human player 12 cycles through the series of pictures until the desired action appears on the screen 22.

FIG. 16 is a block diagram of the major components of the exemplary video game system indicated generally at 19 and also shown in FIG. 8 (FIG. 8 and FIG. 16 show different hand-held control units). Game console 42 includes a housing indicated by the dashed line in FIG. 16 and shown in isometric view in FIG. 8. Disk 43 is shown outside this housing for clarity, but may be played within the housing. Inside this housing is a small computer consisting of microprocessor 86, RAM 90 for storing video game programs and data, boot ROM 91 for power up and reset and may include an operating system such as DOS, nonvolatile EPROM 89, EEPROM, or battery-maintained SRAM for storing digital information that is different for each game console 42, video signal generator 117 (see U.S. Pat. No. 6,139,433) for generating composite or separate audio and video suitable for input to TV set 11 or a video monitor (not shown), and peripheral interface chip 88 for sending and receiving digital data to and from hand-held control units 44 and 47 (FIG. 1) and control units 28 and 29 (FIG. 8).

For clarity, specialized coprocessors for D/A conversion, audio, or for rendering texture-mapped polygons, terrain rendering, and related graphics processing are not shown.

Disk reader 83 reads digital information from plastic optical disks such as disk 43 in which the digital information is molded and burned. Disk reader 83 reads this digital information from two areas of disk 43: from area 81 and from area 80. In area 81 the digital information is represented as a long spiral track or tracks 82 of microscopic pits that are molded into each disk by a disk manufacturer. Digital information in area 81 includes video game programs and data. Area 80, known as the burst cutting area (BCA), typically consists of a circular series of variable-width bar codes that are burned, melted, or heated by a medium power laser beam into each disk after they are molded by the manufacturer. This heating process permanently alters reflectivity of bar-shaped areas of a reflective layer in the disk. The word "burned" will be used herein to encompass the various methods for placing a substantially unique bar code (for each game product) onto each disk, even though the reflective layer is usually not burned through but merely darkened. More than a hundred patents have been issued for optical disks, BCA, and related technology, such U.S. Pat. No. 6,081,785.

In the BCA bar code, each variable width bar represents one bit. The maximum number of bits in the BCA is limited to 1,504 bits (188 bytes) under the current standard. Eighty BCA bits are sufficient for authentication because in the exemplary embodiment, the BCA bits are a block-encrypted cipher of a serial number and another number used for verifying authenticity.

Much of the digital information read from disk 43 by disk reader 83 is controlled by security processor chip 84 so that chip 84 can block processing of video game data from unauthorized disks. An exemplary security chip 84 is further detailed in FIG. 17.

Figure 17:
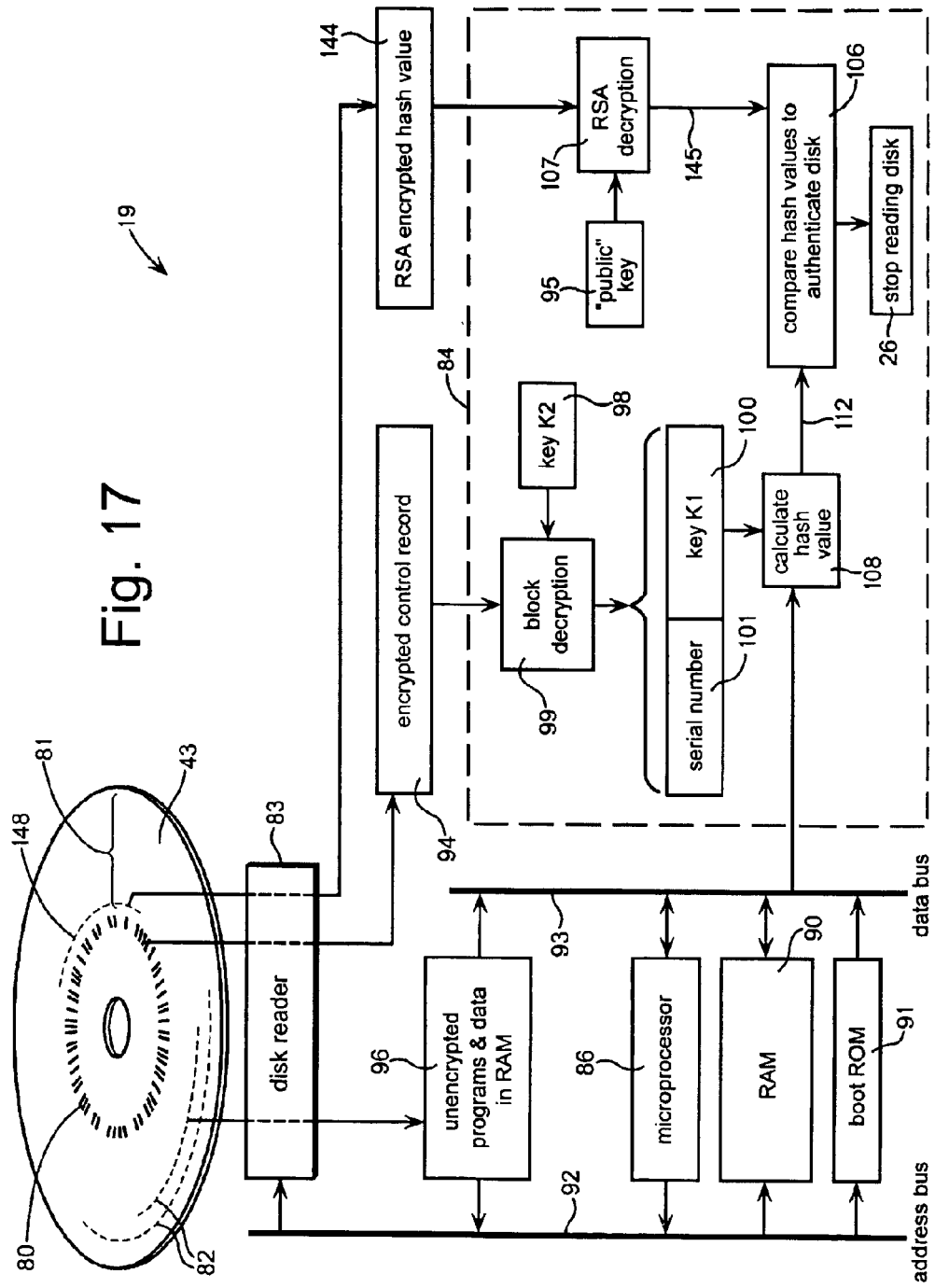
FIG. 17 is a block diagram of the FIG. 16 video game system with details of an exemplary security processor chip.

FIG. 17 shows the video game system of FIG. 16, but with more details on security chip 84 and processing of BCA data. Security chip 84 is a microcontroller with an on-chip microprocessor (not shown) for executing instructions from an on-chip ROM (not shown) to perform functions shown in FIG. 17.

If all authenticating data were in the BCA bar code burned into each disk, then software pirates could easily defeat authentication by copying BCA's from authentic disks to non-authentic disks. It is therefore preferable for disk reader 83 to distinguish at least two physically different types of authenticating data which are shown in FIG. 17 as burned bar codes 80 and molded lead-in control data track 148. In this example, disk reader 83 accepts data from track 148 only if it a molded track with the standard optical properties of molded pits, i.e. not burned or a writable CD. There are numerous ways of making bar codes 80 and molded track 148 physically different. A simple way to make them different is to mold control data 148 into the disk during the same manufacturing step that molded area 81. Mere separation of the burned 80 data from the molded 148 data on different optical tracks or writing some of the data onto a magnetic track would provide little security.

In this example, disk reader 83 distinguishes molded data from burned data in the BCA and this is indicated in FIG. 17 by separate lines through disk reader 83, one line from molded control data track 148, a second line from molded program and data tracks 82, and a third line from burned bar codes 80.

In this example, data from molded control data track 148 includes an encrypted hash value 144 computed from game programs and/or data on tracks 82 during manufacturing (discussed below with reference to FIG. 18). This encrypted hash value 144 is encrypted by the game vendor using a non-symmetrical "public key" cryptographic system as a digital signature. RSA, ECC, or other public-key cryptosystems may be used and are typically controlled by a private and public key of about 1,020 bits and typically produce an encrypted ciphertext of more than 1,020 bits. This ciphertext (encrypted hash value 144) is molded into control track 148. MD5, SHA-1 or similar hashing methods may be used to compute the hash value which may consist of 128-bit, 160-bit, or other size binary numbers before being encrypted. Decryption process 107 uses the same cryptographic method to decrypt value 144 under control of "public key" 95 to produce the original hash value 145. In this example there is no need for public key 95 to be revealed to the public.

Data from burned BCA bar codes 80 includes encrypted control record 94. In this example, encrypted control record 94 consists of at least 88 bits and preferably 128 bits and is encrypted by the game vendor using a symmetric block encryption method such as the Data Encryption Standard (DES), AES, or equivalent, so that changing any one bit of plaintext affects all bits of ciphertext, without providing clues that would lead to discovery of the bit values of the secret key K2 through chosen plaintext attack or chosen ciphertext attack. Secret key K2 is securely stored in security processor chip 84, preferably in EPROM 98, or EEPROM that is physically protected against chip peeling and scanning electron microscopy. Key K2 is not externally readable from chip 84. DES is described in detail in the Federal Register 40FR12134, Mar. 17, 1975. Simplified variations of DES may be used for block decryption process (99 in FIG. 17) and the corresponding block encryption process (147 in FIG. 18).

Block decryption process 99 decrypts encrypted control record 94 under control of secret key K2 (98) to produce a block of decrypted data including serial number 101 and secret key K1 (reference number 100). One-way hashing process 108 calculates a hash value from key 100 hashed together with all or selected portions of the programs and/or data read from tracks 82 into RAM 96.

Processor instructions 106, stored and executed in security chip 84, compare decrypted hash value 145 to calculated hash value 112. If the two numbers are equal, security chip 84 permits further reading of programs and data from disk tracks 82 into RAM 96 for execution by microprocessor 86. If hash values 112 and 145 are different, then process 26 will block further reading of disk 43, perhaps by endless looping.

Figure 18:
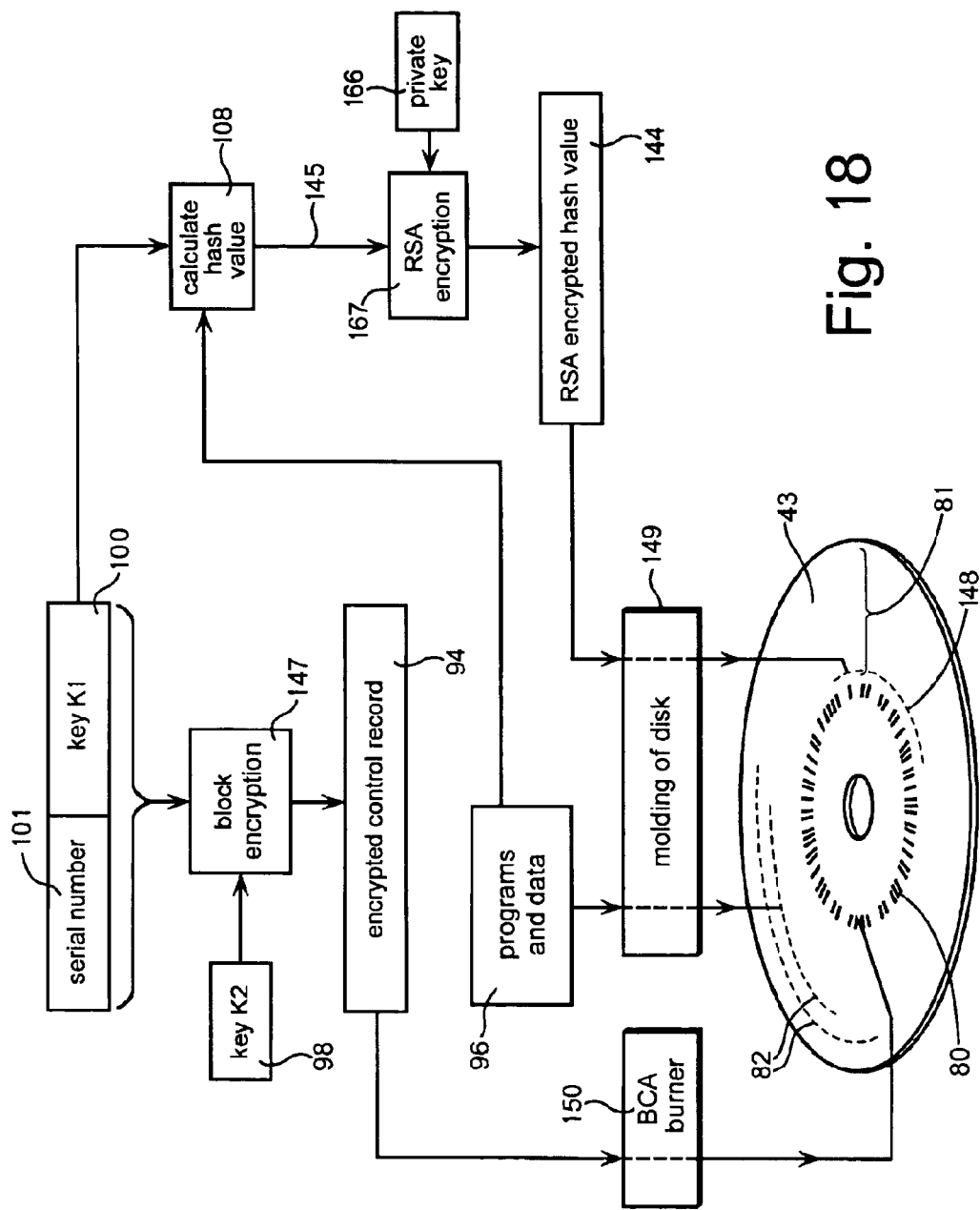
FIG. 18 is a block diagram of a disk manufacturer's process of encrypting data and writing it onto an optical disk.

Block decryption process 99 uses the same secret key 98 for decryption 99 (FIG. 17) as for encryption 147 (FIG. 18). Typically this key 98 is at least 64 bits and preferably 80 bits. In the preferred embodiment, there is not one master key on chip 84, because if it were compromised, perhaps by an employee or contractor of the game vendor, security chip 84 would become useless. Instead, in the preferred embodiment, each security chip includes a table of keys (not shown) so that secret key 98 can be changed in mid production of any game title by changing to a different key in the table. If the key bits in EPROM 98 are intermingled with unused random bits, anybody who accesses the bits will not know which bits are key bits without also reading the on-chip ROM program that knows which bits are key and which are decoys. If key EPROM 98 is mask programmed, that would reduce security of the keys.

Whenever process 99 decrypts encrypted control record 94, one of the decrypted data fields is serial number 101. Therefore in the preferred embodiment, chip 84 includes a process for comparing serial number 101 against table (not shown) of known invalid serial numbers, i.e. serial numbers that have been found on illegally copied game disks. If serial number 101 is invalid, then process 26 will block further reading of disk 43.

Security chip 84 is designed to authenticate game disks such as disk 43, but not to protect the programs and data on the disk from reverse engineering. In this embodiment, it is assumed that game programs and data on tracks 82 are not encrypted. However, in the preferred embodiment, at least a portion of the programs/data on tracks 82 should be encrypted to deter pirates from bypassing security chip 84. Improvements may be added to security chip 84 to decrypt encrypted programs and/or data and other methods of improving security. The details of security chip 84 are given here only as examples and numerous other designs may be used.

FIG. 18 shows a disk manufacturer's process for writing data onto disk 43. Programs and data 96 are molded as tracks 82 into disk 43 by disk molding process 149. During the same molding process, encrypted hash value 144 is also molded into disk 43 in lead-in control track 148. Encrypted hash value 144 is previously computed by the game vendor as follows: Key K1 (reference number 100) is generated as a random number. One-way hashing process 108 then calculates a hash value 145 from key 100 hashed together with all or selected portions of the programs and/or data in RAM 96. MD5, SHA-1 or similar hashing methods may be used to compute hash value 145 which may consist of 128-bit, 160-bit, or other size binary numbers. Any attempt to alter even one bit of the hashed programs and/or data will result in a different hash value 145.

This hash value 145 is then encrypted under control of private key 166 using the same non-symmetrical "public key" cryptographic process discussed above with reference to FIG. 17. The results of encryption process 167 is encrypted hash value 144 which is then molded into control track 148. RSA, ECC, DH, or other public-key cryptosystems may be used for encryption process 167.

Serial number 101 and key K1 (reference 100) are encrypted together (as a block) by block encryption process 147 under control of secret key 98 (key K2) to produce encrypted control record 94. Encrypted control record 94 is then burned into BCA bar codes 80 in disk 43 by BCA burner 150, using a different serial number 101 for each disk 43. This makes the BCA bar code substantially unique for each of the disks.

FIG. 19 shows a record format of exemplary data records use for communication between processor 50 in control unit 28 and microprocessor 86 in console 42 by way of cable 45 or equivalent. Each record 78 consists of several data fields including a control unit identification number so that console 42 will know which control unit generated record 78, a picture serial number so that console 42 will know which video frame is being referred to, and a size factor number so that console 42 will know the degree of enlargement so it can relate LCD screen locations to simulated objects in the picture. Each record 78 has an operation code which specifies the type of data and what type of processing is to be performed.

Examples of operation codes include:
00 initial power up
01 identify location and size factor of displayed picture
02 move object located at ($X_1$ $Y_1$) to location ($X_2$ $Y_2$)
03 first person approach to object located at ($X_1$ $Y_1$)
04 build object id3 between locations ($X_1$ $Y_1$) and ($X_2$ $Y_2$)
05 change object located at ($X_1$ $Y_1$) with object id3
06 destroy objects between ($X_1$ $Y_1$) and ($X_2$ $Y_2$)
07 show hand grasping object at ($X_1$ $Y_1$)
08 show object at ($X_1$ $Y_1$) entering object at ($X_2$ $Y_2$)
09 enlarge object located at ($X_1$ $Y_1$)
10 change camera angle to center on object at ($X_1$ $Y_1$)
11 retreat from object at ($X_1$ $Y_1$)
12 selection from action menu
13 cancel or undo previous action serial number nnn Since the above X,Y coordinates typically refer to physical locations (in pixels or millimeters) on LCD 22 and not always to spatial coordinates X,Y,Z in the simulated world of the animated characters, there is no Z spatial coordinate in the FIG. 19 record format. However, if control unit processor 50 (FIG. 4) can convert physical LCD location coordinates into simulated spatial coordinates and send this data to console 42, then the location data in FIG. 19 would change accordingly. If processor 50 can determine the character action corresponding to a LCD location and send this action data to console 42, the FIG. 19 record would include numbers specifying selected actions.

FIG. 20 is a memory map of various programs and data in RAM 53 in control unit 28 (FIG. 4). Many of the functions performed by these programs are combined in the flowchart in FIG. 21.

Figure 21:
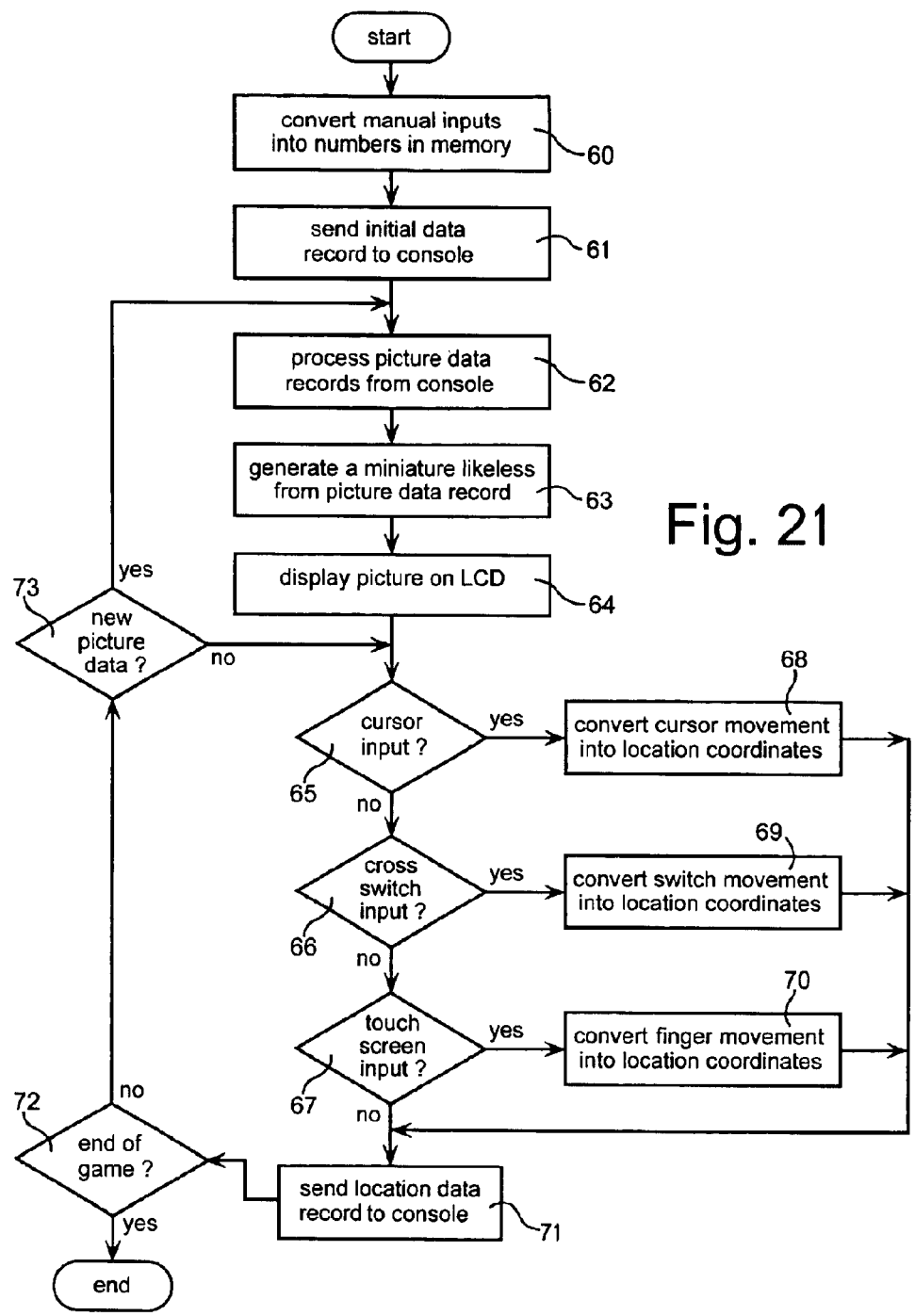
FIG. 21 is a flow chart of program processes in a hand-held control unit.

FIG. 21 is an exemplary flow chart illustrating a sequence of functions performed by some of the programs temporarily stored in RAM 53 in control unit 28. FIG. 21 begins with program process 60 which executes out of ROM 76 and converts any initial manual inputs into numbers in memory to be sent to console 42. For example, a player may hold down button 14 as he or she turns on electric power to control unit 28 to activate previously stored game status data. Then in program process 61 (operating out of ROM 76) processor 50 sends a power-up data record (operation code 00) to console 42 which requests that console 42 send initial programs (read from disk 43) to control unit 28 for storage in RAM 53. When those programs are stored, processor 50 continues with program 62 which processes picture data records received from console 42.

Process 63 then generates a picture for display on LCD 22 that is a miniature likeness of the TV frame currently displayed on TV screen 56. Process 64 then displays the miniature likeness picture on LCD 22. The control unit program then enters a program loop which checks (decision boxes 65, 66, 67) for any manual input from a cross-switch, joystick, touchscreen, touchpad, or button switches to determine which kind of location data to send to console 42 (boxes 68, 69, 70). Control unit processor 50 then sends a location data record (or other type of record) to console 42. The interrupt feature of processor 50 may be used to insure that loops shown in FIG. 21 do not interfere with other functions performed by processor 50.

Processor 50 in control unit 28 may generate many of the picture sequences with infrequent guidance from console 42, especially during time intervals when the pictures displayed on LCD 22 are not being displayed on TV screen 56. For example in a war game (referring to FIGS. 12, 13, and 14), strategic and tactical planning may be controlled by each player on separate hand-held control units 44 and 47. Because these private pictures and/or words are not shared with other players by way of TV screen 56, there is no need for frequent sending of data records back and forth between control units and console 42 during these private phases of the interactive game. During this private phase, each control unit acts independently of console 42, executing programs for planning, deployment of soldiers, movement of supplies, building of bridges, destroying enemy barriers, reconnaissance, displaying reports from spies etc, while the TV screen shows generic scenes and information already known to both sides, such as maps of recent battles, or animated characters controlled by other players.

During game phases where the TV pictures are related to the LCD pictures, there will be much sending and receiving of data records between control units and console 42. During these shared phases, console 42 programs in RAM 90 (FIG. 16) determine what is to be displayed on each control unit 28, 44, etc. and generate picture or program data records which microprocessor 86 sends to one or the other control units. When a control unit receives a data record from console 42, decision box 73 transfers control to process 62 which processes the received picture data record. If data records from console 42 contains program instructions, process 62 in this example will load the downloaded program into RAM 53 for execution in the control unit processor 50.

Figure 22:
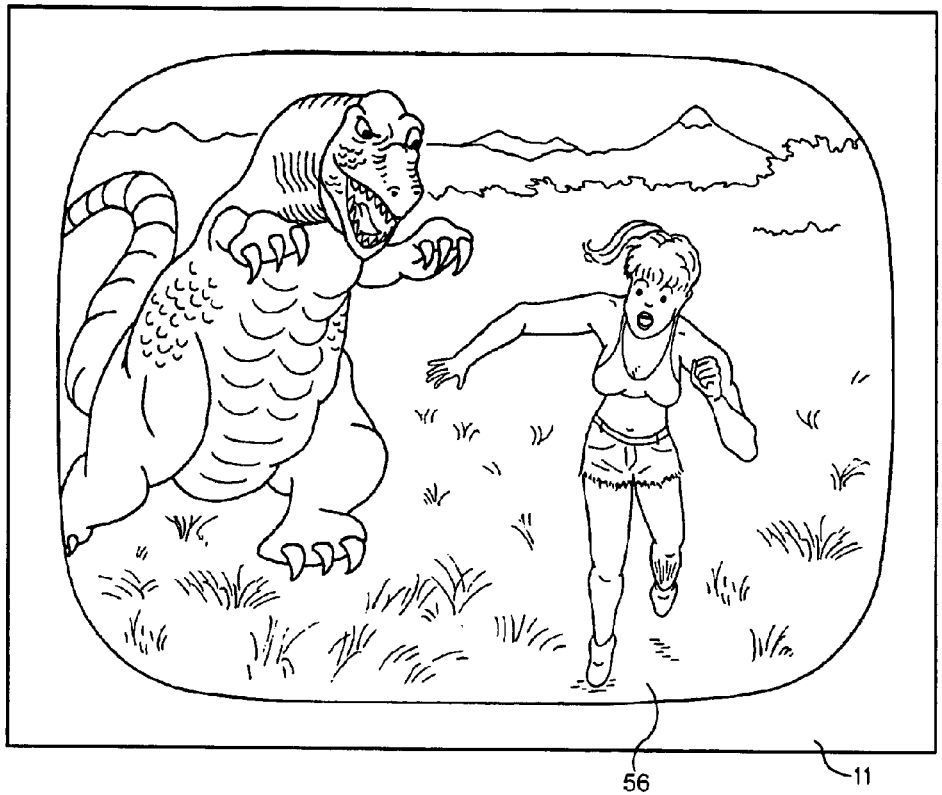
FIG. 22 is a TV screen displaying a picture of a video game scene to illustrate the detail that may occur in such a picture.

FIGS. 22 and 23 illustrate the relationship between video pictures on TV screen 56 and a miniature likeness being displayed on LCD screen 22. In FIG. 22 a large detailed picture is being displayed on TV screen 56. If this detailed picture is greatly reduced in size (perhaps by 90%) for display on a small LCD screen 22 on a hand-held control unit 28, many of the details may be lost and the miniature picture may become unintelligible.

Figures 23A, 23B, 23C:
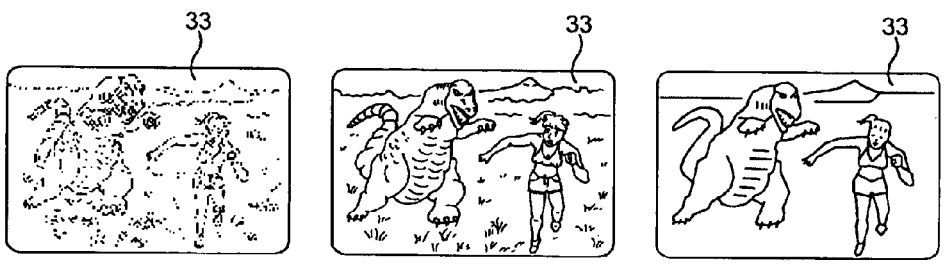
FIGS. 23a, 23b, and 23c are an LCD screen displaying a likeness of the picture in FIG. 22 but greatly reduced in size.

FIG. 23a illustrates this loss of detail. One way of avoiding this problem is for processor 50 to generate wider lines and other details as in FIG. 23b from compressed data supplied by console 42. The LCD picture 33 in FIG. 23b is a miniature likeness for display on LCD 22 and does not have to be an exact copy of the TV screen picture reduced in size. Another method is illustrated in the FIG. 23c picture which consists of about 250 short line segments that together form a simplified likeness of the picture on TV screen 56 and omits fine textures displayed on TV screen 56. Further simplified pictures may be used on LCD 22.

Figure 24:
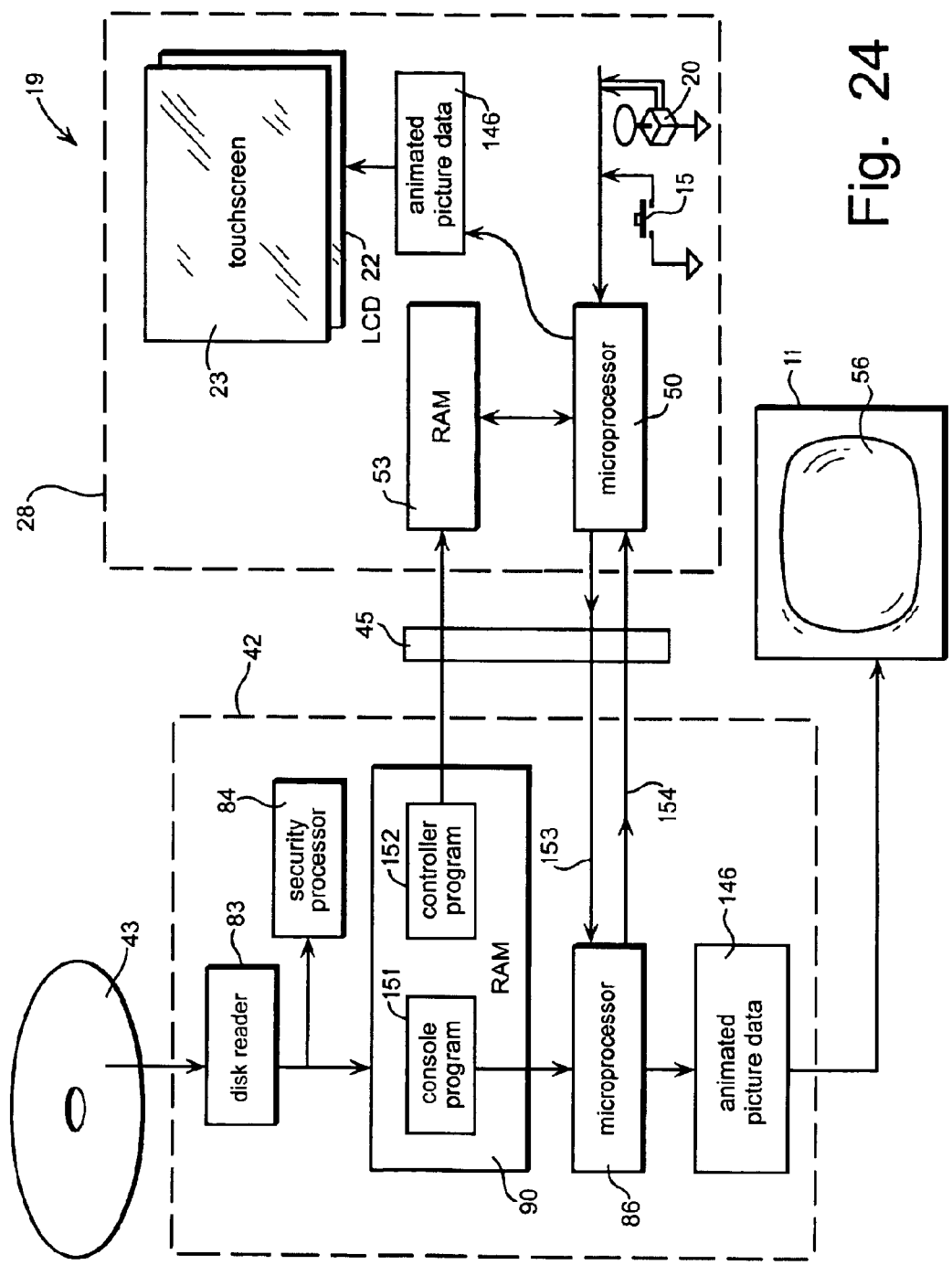
FIG. 24 is a simplified block diagram of the system showing how data flows between the console and a hand-held control unit.

FIG. 24 shows an exemplary and simplified block diagram of system 19 showing how data flows between console 42 and a hand-held control unit 28. When disk reader 83 reads game programs into RAM 90, the programs in this example are of two kinds, console program(s) 151 with associated data, and controller program(s) 152 with associated data. Focusing on the programs, controller program 152 is transmitted to RAM 53 in hand-held control unit 28 and executed in microprocessor 50. Console program 151 is stored in RAM 90 and executed by microprocessor 86 which generates animated picture data 146 representing one or more animated characters performing an action. This data stored in RAM 146 is converted to a video signal as described above with reference to FIG. 16. This video signal is passed to TV 11 by way of cable 41 (FIG. 16) and is displayed as animated pictures on TV screen 56. Microprocessor 86 also generates data records which it sends (arrow 154) to control unit 28. An example of a data record 78 is illustrated and discussed above with reference to FIG. 19. Other record formats may be used by programs 151 and 152.

Execution of console program 151 is controlled by data received (arrow 153) by console 42 from microprocessor 50 in control unit 28. Microprocessor 50 receives (arrow 154) the data records received from console 42 and this data affects execution of program 152 in microprocessor 50 which also receives manually entered input signals from cross-switch 15 (only one of the 4 switches is shown), analog joystick 20, touchscreen 23, and/or other manual controls. These input signals result from a human player's decisions based on animated pictures that are displayed on LCD 22 from animated picture data 146 generated by microprocessor 50 executing program 152 in RAM 53. The input signals also control execution by microprocessor 50 which sends corresponding data records (arrow 153) to console 42.

Figure 25:
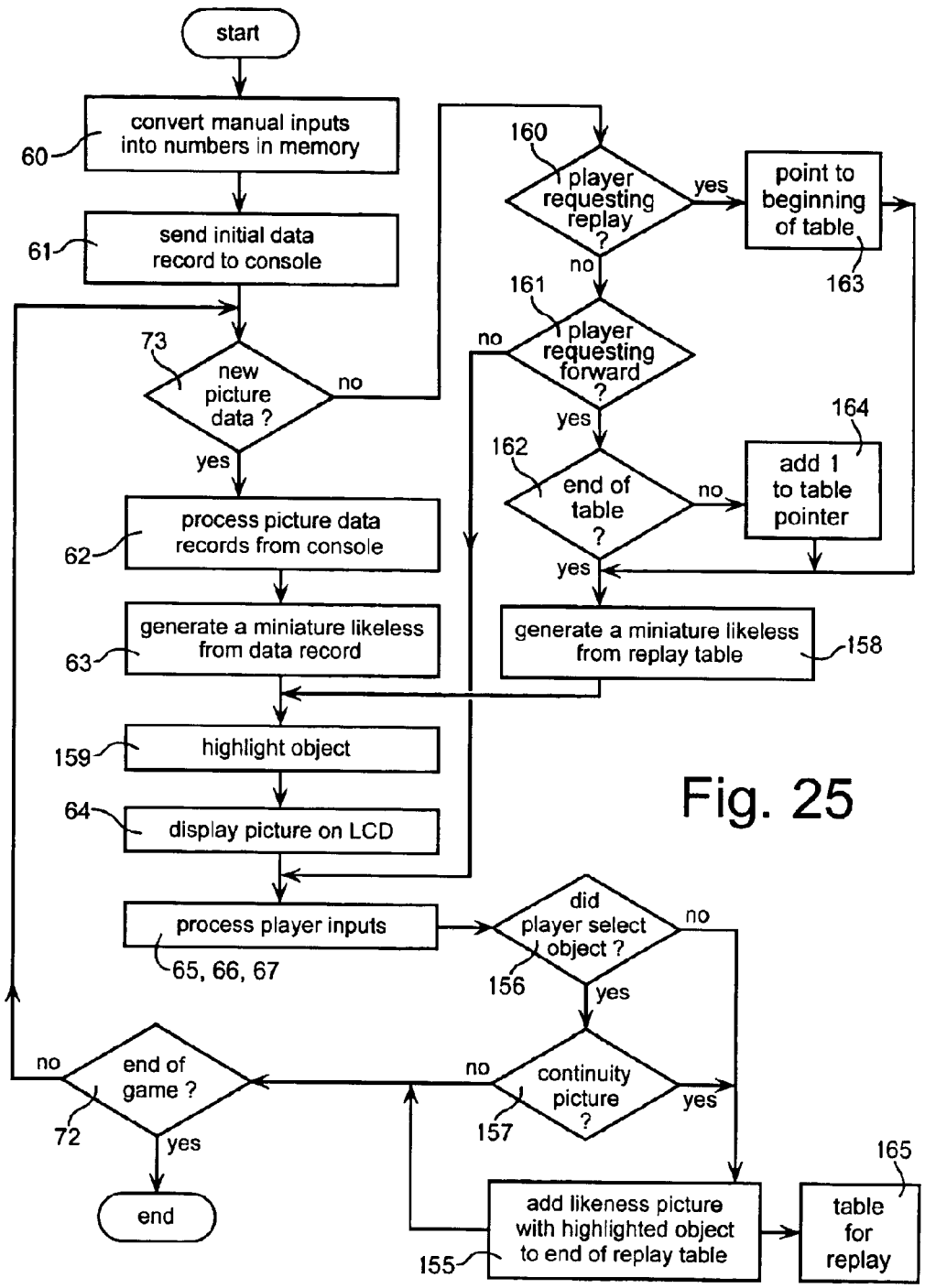
FIG. 25 is a flow chart of program processes in a hand-held control unit.

FIG. 25 is an exemplary flow chart illustrating a sequence of functions performed by some of the programs temporarily stored in RAM 53 in control unit 28 to replay pictures previously displayed on LCD 22. As with FIG. 21 discussed above, FIG. 25 begins with program process 60 which executes out of ROM 76 and converts any initial manual inputs into numbers in memory to be sent to console 42. Then in program process 61 (executing out of ROM 76) processor 50 sends a power-up data record to console 42 (as discussed above with reference to FIG. 21). If decision box 73 determines that a new picture-data record has been received by control unit 28, processor 50 continues with process 62 which processes picture data records received from console 42. From this data, process 63 then generates a picture for display on LCD 22 that is a miniature likeness of the TV frame currently displayed on TV screen 56. Program 159 provides blinking or highlights, if any are specified in the picture-data record, to accent objects (such as 31 on FIG. 1) in the likeness picture. Program 64 then displays the likeness picture on LCD 22. Processes 65, 66, and 67 (discussed above with reference to FIG. 21) then check for player manual input.

Decision box 156 determines if the player has manually selected a blinking or highlighted object. If such an object was not selected, the object is still selectable and the player may want to return to it later using the replay feature detailed here. Decision box 156 then passes control to process 155 which adds a new record to a replay table 165 of data in RAM 53 from which the full-screen picture containing the blinking or highlighted object can be regenerated on LCD 22. A digital pointer (not shown) points to the last (latest) record in table 165. If the object was selected (and therefore no longer blinking or highlighted), decision box 157 determines if the picture should still be saved in replay table 165 to preserve continuity of motion during later use of the replay feature. For example, data for regenerating one picture per second may be saved in replay table 165. Processor 50 proceeds to decision box 72 in FIG. 25 which loops back to decision box 73.

If decision box 73 in FIG. 25 determines that no picture-data records are pending, processor 50 proceeds to decision box 160 which checks button-switches and other manual inputs to determine if a player has requested the replay option. If yes, process 163 sets a pointer to the beginning (oldest record) of replay table 165 discussed above, and process 158 generates a miniature likeness from data in replay table 165. If decision box 161 determines that the player selected the fast-forward option to return picture-by-picture to the latest likeness picture, process 164 adds 1 (one) to the table pointer which points to the next data record in replay table 165. If decision box 161 determines that the player has not selected either the replay or fast-forward options, control passes to process 65 discussed above.

As used herein, the term "video screen" includes the display area of a television screen, computer monitor, video monitor, RGB monitor, CRT, and the like. The term "video" includes composite, non-composite, RGB, monochrome, color, analog, digital, and MPEG video, and the like. The term "molded" includes injection molded, pressed, stamped, and other disk manufacturing methods.

The term "likeness" includes pictures that have a similar character performing a similar action, even though there are noticeable differences in resolution, texture, and other details. The term "program" as used herein may consist of more than one loadable module and includes executable instructions and any data that is typically part of a program module or modules.

The term "LCD" (liquid crystal display) has been used herein as an illustrative example of any discrete display apparatus having discrete picture elements.

Although I have described my invention with a degree of particularity in connection with what is presently considered to be the most practical and preferred embodiment, it is to be understood that the present disclosure has been made only by way of example and that my invention is not to be limited to the disclosed embodiment, but on the contrary, is intended to cover various modifications and equivalent arrangements, steps, and components included within the spirit and scope of the appended claims.

REFERENCE NUMBERS IN DRAWINGS 10 human player
11 television (TV) set or video monitor
12 human player
13 LCD screen
14 push button
15 cross-switch
16 memory cartridge
17 picture of player-controlled character
18 picture of player-controlled character
19 video game system generally
20 joystick assembly
21 joystick assembly
22 LCD screen
23 touch screen
24 touch pad
25 small area of LCD screen
26 process of stop reading disk
27 speaker
28 hand-held control unit with handles
29 hand-held control unit with handles
30 representation of military barrier
31 clue object
32 picture of emotional face 33 picture on LCD screen
34 picture on LCD screen
35 picture of iron pipe
36 picture of player character's hand
37 picture of player character's hand
38 infrared communication unit
39 representation of a bridge
40 electrical connector
41 cable linking game console to TV
42 video game system console
43 optical disk
44 hand-held control unit
45 cable linking control unit to console
46 hand-held control unit
47 hand-held control unit
48 highlighted image
49 cursor
50 microprocessor
51 touchpad processor
52 memory security processor
53 random access memory (RAM)
54 game product number
55 process of checking authenticity of disk
56 TV screen
57 selection push-button
58 dinosaur's foot
59 cursor
60 program process
61 transmission of data
62 program process
63 program process
64 displaying an LCD picture
65 program decision
66 program decision
67 program decision
68 program process
69 program process
70 program process
71 transmission of data
72 program decision
73 program decision
74 map display area
75 map display area
76 read only memory (ROM)
77 memory map of programs
78 location data record
79
80 burst cutting area (BCA) of disk
81 program and data area of disk
82 tracks molded into disk
83 optical disk reader
84 security processor
85 speaker in TV set
86 microprocessor
87 electrical connector
88 peripheral interface processor
89 EPROM or EEPROM
90 RAM
91 boot ROM
92 address bus
93 data bus
94 encrypted control record
95 "public" key
96 unencrypted programs and/or data in RAM
97
98 secret key k2
99 process of block decryption
100 decryption key k1
101 disk serial number
102 process of validating disk serial number
103
104
105
106 process of authenticating programs/data
107 process of RSA decryption
108 process of calculating hash values
109
110
111
112 hash value
113
114
115
116
117 video signal generator
118 video game system generally
119 LCD driver circuit
120
140
141
142
143
144 RSA encrypted hash value
145 hash value
146 animated picture data
147 process of block encryption
148 lead-in control information
149 process of molding disk
150 process of burning BCA into disk
151 console program
152 controller program
153 data transmission
154 data transmission
155 program process
156 program decision
157 program decision
158 program process
159 program process
160 program decision
161 program decision
162 program decision
163 program process
164 program process
165 table of data in RAM
166 RSA private key
167 RSA encryption process

I claim:

1. For use in a game system having a first game apparatus containing a first processor, and a separately housed portable game system containing a second processor and a discrete display device, a method of operating said game system comprising the steps of:

(a) executing a first game program in said first processor to generate first non-sprite polygon data that represents a shape of at least a portion of a first 3-dimensional player-controlled character moving in a first simulated 3-dimensional game world;

(b) mapping texture onto said first polygon data to represent a textured portion of said first player-controlled character for display on a first display device;

(c) digitally transferring game data from said first processor through a data transmission link to said second processor;

(d) executing a second game program in said second processor in accordance with said transferred game data to generate second non-sprite polygon data that represents a shape of at least a portion of a second 3-dimensional player-controlled character moving in a second simulated 3-dimensional game world; and (e) mapping texture onto said second polygon data in said portable game system to represent a textured portion of said second player-controlled character for display on said discrete display device in said portable game system.

2. The method of claim 1, wherein said discrete display device is a liquid crystal display (LCD) device.

3. The method of claim 1, wherein at least one of said processors cooperates with a graphics coprocessor for converting said textured polygon data to pixels for display.

4. The method of claim 1, further comprising the step of mapping textures onto third non-sprite polygon data to represent an object moving in said second simulated 3-dimensional game world for display on said discrete display device in said portable game system.

5. The method of claim 1, further comprising the steps of:

(f) generating game control data in said first processor to specify at least one variable of at least one body part of said first player-controlled character;

(g) transmitting said game control data from said first processor through said data transmission link to said second processor;

(h) executing a third game program in said second processor to generate third texture mapped non-sprite polygon data of said first player-controlled character in accordance with said variable specified in said transmitted game control data; and (i) rendering said third textured polygon data for display on said discrete display device in said portable game system.

6. The method of claim 5, wherein said variable represents at least one from the group comprising: location of an object, direction of movement of an object, velocity of an object, orientation of an object, operation code, size factor, object identifier, character identifier, picture identifier, unit identifier, spatial coordinate, rotation, data to appear on a map, word menu, picture menu, terrain identifier, texture identifier, and polygon identifier.

7. The method of claim 5, further comprising the step of generating fourth non-sprite polygon data that represents said second player-controlled character in a first portion of said second simulated game world and later in a second portion of said second game world in accordance with said variable specified in said transmitted game control data.

8. The method of claim 1, wherein said second processor comprises means for rendering said second polygon data representing body parts of said second player-controlled character.

9. The method of claim 1, further comprising the step of processing data in said first processor representing at least one from the group comprising: words, numbers, symbols, faces, maps, static pictures, and picture menus that is transmitted from said first processor to said second processor to cause generation of picture data for display on said discrete display device.

10. The method of claim 1, further comprising the step of enlarging a portion of an object in said second polygon data so as to display a portion of the object in greater detail on said discrete display device.

11. The method of claim 1, further comprising the steps of:

(f) displaying a manually controlled indicator on a selected object displayed on said discrete display device; and (g) generating third non-sprite polygon data that represents a shape of said selected object moving in said second game world under manual control for display on said discrete display device.

12. The method of claim 1, further comprising the step of generating non-sprite polygon data that represents a shape of at least a portion of said first player-controlled character in said second simulated game world in said portable game system in accordance with said transmitted game data.

13. The method of claim 1, wherein said data transmission link comprises wireless transmission.

14. The method of claim 1, wherein at least one of said textures is simplified to a featureless texture.

15. The method of claim 1, wherein said first and second player-controlled characters are substantially the same character.

16. The method of claim 1, wherein said first and second simulated game worlds are substantially the same game world.

17. The method of claim 1, wherein said first game apparatus is a portable game system.

18. The method of claim 1, wherein said first display device is a liquid crystal display (LCD) device.

19. The method of claim 1, further comprising the steps of:

(f) storing a third game program in said first game apparatus for execution in said second processor; and (g) transmitting said third game program from said first processor through said data transmission link to said second processor for execution in said second processor.

20. The method of claim 1, further comprising the step of transferring game data from said first game apparatus through a data transmission link to cause display of game images on more than one discrete display device.

21. The method of claim 1, further comprising the steps of detecting a predetermined condition and modifying at least a portion of non-sprite polygon data if said predetermined condition is detected.

22. The method of claim 21, wherein said predetermined condition is defined as one of said player-controlled characters contacting an object in one of said game worlds.

23. The method of claim 21, wherein said predetermined condition is defined as one of said player-controlled characters being manually controlled to enter a predetermined area in one of said game worlds.

24. The method of claim 21, wherein said predetermined condition is defined as manual selection of an object in one of said game worlds.

25. The method of claim 21, wherein said predetermined condition is defined as one of said player-controlled characters grasping an object in one of said game worlds.

26. The method of claim 21, wherein said predetermined condition is defined as one of said player-controlled characters moving away from an object in one of said game worlds.

27. The method of claim 21, wherein said predetermined condition is defined as one of said player-controlled characters moving toward an object in one of said game worlds.

28. The method of claim 21, wherein said predetermined condition is defined as the current display size of a body part of one of said characters being smaller than a predetermined amount and said modified polygon data represents an enlarged image of the character's body part.

29. The method of claim 21, wherein said predetermined condition is defined as a manually operated physical object being in contact with a variable location on a touch sensitive surface in said portable game system.

30. The method of claim 29, wherein said manually operated object is a finger of a human operator.

31. The method of claim 21, wherein said predetermined condition is defined as a manually operated physical object moving in contact with a touch sensor in said portable game system.

32. The method of claim 21, wherein said predetermined condition is defined as data entry into said portable game system of at least one from the group comprising: number, letter, symbol, word, cursor, map location, menu selection, highlight, icon selection, drag and drop, and manual operation of a control device.

33. The method of claim 21, wherein said predetermined condition is defined as manual entry of a request for replay of a prior game display sequence for display on said discrete display device.

34. The method of claim 21, wherein said predetermined condition is defined as manual entry of a request for a preview of a possible future game display sequence for display on said discrete display device.

35. The method of claim 21, wherein said predetermined condition is defined as receiving into said portable game system said data transmitted through said data transmission link.

36. The method of claim 21, wherein said predetermined condition is defined as generating of third data that represents a predetermined object for display on said first display device.

37. The method of claim 21, wherein said modified polygon data represents a body part of one of said characters.

38. The method of claim 21, wherein said modified polygon data represents a hand of one of said characters.

39. The method of claim 21, wherein said modified polygon data represents an object in simulated contact with a hand of one of said characters.

40. The method of claim 21, wherein said modified polygon data causes display of a modified body part of one of said characters.

41. The method of claim 1, wherein at least a portion of said transferred game data specifies at least one from the group comprising: operation code, size factor, object identifier, character identifier, picture identifier, unit identifier, spatial coordinate, location, velocity, rotation, direction, orientation, data to appear on a map, word menu, picture menu, terrain identifier, texture identifier, and polygon identifier.

42. The method of claim 1, wherein at least a portion of said transferred game data specifies a variable direction of movement in said second data of at least one body part of said second player-controlled character.

43. The method of claim 1, wherein at least a portion of said transferred game data specifies a variable location in said second data of at least one body part of said second player-controlled character.

44. The method of claim 1, wherein at least a portion of said transferred game data is program instructions for execution in said second processor.

45. The method of claim 1, wherein at least a portion of said transferred game data is polygon data from which said second processor generates texture mapped data for display on said discrete display device.

46. The method of claim 1, wherein at least some body parts of one of said characters are articulated and bendable under control of at least one manually operable control device.

47. The method of claim 1, wherein at least one of said first and second polygon data represents articulated fingers that are controlled by at least one manually operable control device.

48. The method of claim 1, wherein at least one of said first and second polygon data represents at least one from the group comprising: arm, leg, hand, finger, head, face, eye, mouth, claw, shoe, and clothing.

49. The method of claim 1, wherein at least one of said player-controlled characters is humanoid in regards to body shape and body parts.

50. The method of claim 1, wherein at least one of said player-controlled characters is non-humanoid in regards to body shape and body parts.

51. The method of claim 1, wherein at least one of said player-controlled characters is an inanimate object having plural parts.

52. The method of claim 1, further comprising the steps of:
digitally reading said second game program from a data storage device into said video game apparatus; and
digitally transferring said second game program from said video game apparatus to said portable game system for execution in said second processor.

53. The method of claim 1, wherein said first game program is stored on a data storage device and wherein said video game apparatus reads said first game program from the data storage device into said video game apparatus for execution in said first processor.

54. The method of claim 1, wherein said second game program is stored in a program memory cartridge that is manually removable from said portable game system.

55. The method of claim 1, wherein at least one of said game programs is stored on a program/data storage disk that is read by a disk reader controlled by one of said processors.

56. The method of claim 1, wherein manipulation of at least one manually operated control device on said portable game system causes said second processor to generate control data that is transfered to said first processor to control generation of said first data.

57. The method of claim 1, further comprising the steps of generating movement of body parts of said first player-controlled character in response to manual operation of a first control device; and generating movement of body parts of said second player-controlled character in response to manual operation of a second control device.

58. The method of claim 57, wherein said first and second control devices are housed in the same handheld controller.

59. The method of claim 57, wherein said first and second control devices are housed in said portable game system.

60. The method of claim 1, wherein at least one touch sensitive data entry device in said portable game system generates control data to control motion of at least one of said player-controlled characters.

61. The method of claim 1, wherein at least one touch sensitive data entry device senses locations on said discrete display device of a physical object touching said data entry device.

62. The method of claim 1, further comprising the step of generating data representing plural body parts of one of said characters moving from said first simulated game world to said simulated game world.

63. The method of claim 1, further comprising the step of generating data representing plural body parts of one of said characters moving from said second simulated game world to said first simulated game world.

64. The method of claim 1, wherein said data transmission link is bi-directional.

65. The method of claim 1, wherein said first and second game programs are stored in a data carrier.

66. A data carrier for use in a first game apparatus containing a first processor that is digitally linked to a separately housed portable game system containing a second processor and a discrete display device, the data carrier carrying game program instructions and data comprising:

(a) first program instructions that cause said first processor to generate first non-sprite polygon data that represents a shape of at least a portion of a first 3-dimensional player-controlled character moving in a first simulated 3-dimensional game world, the first polygon data being texture mapped so that the texture represents a displayable portion of said first character for display on a first display device;

(b) second program instructions that cause said first processor to transfer game data through a data transmission link to said second processor to cause said second processor to generate second non-sprite polygon data that represents a shape of at least a portion of a second 3-dimensional player-controlled character moving in a second simulated 3-dimensional game world; and (c) said second processor further mapping texture onto said second polygon data so that the texture represents a displayable portion of said second player-controlled character for display on said discrete display device in said portable game system.

67. The data carrier of claim 66, wherein said data carrier is a disk on which programs and data are stored.

68. The data carrier of claim 66, wherein said data carrier is a semiconductor data storage memory.

69. The data carrier of claim 66, wherein said data carrier is an optically coded disk.

70. The data carrier of claim 66, wherein said first processor comprises a central processor and a graphics co-processor.

71. The data carrier of claim 66, wherein said second processor comprises a central processor and a graphics co-processor.

72. The data carrier of claim 66, wherein said first and second player-controlled characters are substantially the same character.

73. The data carrier of claim 66, wherein said first and second simulated game worlds are substantially the same game world.

74. The data carrier of claim 66, wherein said first and second simulated game worlds are different portions of the same game world.

75. The data carrier of claim 66, wherein at least a portion of said transferred game data specifies at least one from the group comprising: operation code, size factor, object identifier, character identifier, picture identifier, unit identifier, location, velocity, rotation, direction, orientation, spatial coordinates, data to be displayed on a map, word menu, picture menu, terrain identifier, texture identifier, and polygon identifier.

76. The data carrier of claim 66, wherein at least one of said displayable portions comprise at least one from the group comprising: arm, leg, hand, finger, head, face, eye, mouth, claw, shoe, clothing, and tool.

77. The data carrier of claim 66, further comprising program instructions that are downloaded from said first game apparatus through a data transmission link to said portable game system and executed in said second processor in said portable game system.

78. The data carrier of claim 66, further comprising graphics that is downloaded from said first game apparatus through a data transmission link to said portable game system and processed in said second processor in said portable game system.

79. The data carrier of claim 66, wherein said data transmission link comprises wireless transmission.

80. A game system comprising:

(a) a first game apparatus having a first processor for executing a first game program to generate first non-sprite polygon data that represents a shape of at least a portion of a first 3-dimensional player-controlled character moving in a first simulated 3-dimensional game world;

(b) means in said first game apparatus for mapping texture onto said first polygon data to represent a textured portion of said first player-controlled character for display on a first display device;

(c) a data transmission link for transferring game data from said first processor to a second processor in a separately housed portable game system;

(d) said second processor in said portable game system for executing a second game program in accordance with said transferred game data to generate second non-sprite polygon data that represents a shape of at least a portion of a second 3-dimensional player-controlled character moving in a second simulated 3-dimensional game world; and (e) means in said portable game system for mapping texture onto said second polygon data to represent a textured portion of said second player-controlled character for display on a discrete display device in said portable game system.

81. The game system of claim 80, further comprising a first manually operated control device for controlling movement of said first player character, and a second manually operated control device for controlling movement of said second player character.

82. The game system of claim 81, wherein said first and second control devices are housed in the same controller.

83. The game system of claim 81, wherein said first and second control devices are housed in said portable game system.

84. The game system of claim 80, wherein said first and second player-controlled characters are substantially the same character.

85. The game system of claim 80, wherein at least one of said first and second polygon data represents articulated fingers that are controlled by at least one manually operable control device.

86. The game system of claim 80, further comprising at least one graphics coprocessor for converting at least one of said textured portions to pixels for display.

87. The game system of claim 80, wherein said discrete display device is a liquid crystal display (LCD) device.

88. The game system of claim 80, wherein said discrete display device displays a map of at least a portion of one of said game worlds.

89. The game system of claim 80, further comprising at least one touch sensitive data entry device.

90. The game system of claim 80, further comprising at least one touch sensitive data entry device that senses locations on said discrete display device of a physical object touching said data entry device, and said second processor modifies said second polygon data in accordance with movement of said touching object so that said discrete display device displays a textured portion of said second character that moves in a direction indicated by said movement of said touching object.

91. The game system of claim 80, further comprising a manually operable control device for controlling enlargement and reduction of a selected area of one of said game worlds for display on said discrete display device.

92. The game system of claim 80, further comprising a plurality of said portable game systems, each receiving game data transferred from said first game apparatus.

93. The game system of claim 80, wherein said first game program is stored on a program/data storage disk and wherein said first game apparatus further comprises a disk reader for reading said first game program from the storage disk.

94. The game system of claim 80, wherein at least a portion of said second game program is stored on a program/data storage disk and wherein said first game apparatus reads said portion of said second game program from the storage disk and transfers the second game program portion to said portable game system for execution in said second processor.

95. The game system of claim 80, wherein said first game apparatus is a portable game system.

96. The game system of claim 80, wherein said first display device is a discrete display device.

97. The game system of claim 80, wherein said data transmission link comprises wireless transmission.

98. The game system of claim 80, wherein at least one of said textures is simplified to a featureless texture.

99. For use in a game system having a first game apparatus containing a first processor, and a separately housed portable game system containing a second processor and a discrete display device, a method of operating said game system comprising the steps of:
(a) executing a first game program in said first processor to generate first renderable polygon vertex data that represents a shape of at least a portion of a first 3-dimensional player-controlled character moving in a first simulated 3-dimensional game world;
(b) digitally rendering said first polygon vertex data to compute displayable first pixels that represent at least a portion of said first player-controlled character for display of said first pixels on a first display device;
(c) digitally transferring game data from said first processor through a data transmission link to said second processor;
(d) executing a second game program in said second processor in accordance with said transferred game data to generate second renderable polygon vertex data that represents a shape of at least a portion of a second 3-dimensional player-controlled character moving in a second simulated 3-dimensional game world; and
(e) digitally rendering said second polygon vertex data to compute displayable second pixels that represent at least a portion of said second player-controlled character for display of said second pixels on said discrete display device in said portable game system.

100. The method of claim 99, wherein said first processor cooperates with a graphics coprocessor for rendering said first polygon vertex data.

101. The method of claim 99, wherein said second processor cooperates with a graphics coprocessor for rendering said second polygon vertex data.

102. The method of claim 99, wherein said data transmission link comprises wireless transmission.

103. The method of claim 99, wherein at least one of said displayable portions of said second player-controlled character is simplified to a featureless texture.

104. The method of claim 99, wherein said first and second player-controlled characters are substantially the same character.

105. The method of claim 99, wherein said first and second simulated game worlds are substantially the same game world.

106. The method of claim 99, wherein said first game apparatus is a portable game system.

107. The method of claim 99, wherein said first display device is a liquid crystal display (LCD) device.

108. The method of claim 99, further comprising the steps of:
(f) storing a third game program in said first game apparatus for execution in said second processor; and
(g) transmitting said third game program from said first processor through said data transmission link to said second processor for execution in said second processor.

109. The method of claim 99, further comprising the step of transferring game data from said first game apparatus through a data transmission link to cause display of game images on more than one discrete display device.

110. The method of claim 99, further comprising the steps of detecting a predetermined condition and modifying at least one of said polygon vertex data if said predetermined condition is detected.

111. The method of claim 110, wherein said predetermined condition is defined as one of said player-controlled characters grasping an object in one of said game worlds.

112. The method of claim 110, wherein said predetermined condition is defined as one of said player-controlled characters contacting an object in one of said game worlds.

113. The method of claim 110, wherein said predetermined condition is defined as a manually operated physical object being in contact with a variable location on a touch sensitive surface in said portable game system.

114. The method of claim 113, wherein said manually operated object is a finger of a human operator.

115. The method of claim 99, wherein at least one of said first and second game programs are stored in a data carrier.

116. The method of claim 99, wherein a touch sensitive data entry device in said portable game system senses locations on said discrete display device of a manually controlled physical object touching said data entry device.

117. The method of claim 99, wherein at least one of said player-controlled characters is controlled by a combination of manual operation of a second control device in said portable game system and a touch sensor in said portable game system sensing locations on said discrete display device of a manually controlled physical object touching said touch sensor.

118. For use in a game system having a first game apparatus containing a first processor, and a separately housed portable game system containing a second processor and a discrete display device, a method of operating said game system comprising the steps of:
(a) executing a first game program in said first processor to generate first renderable polygon vertex data that represents body parts of a first 3-dimensional player-controlled character moving in a first simulated 3-dimensional game world;
(b) digitally rendering said first polygon vertex data to compute displayable first pixels that represent at least one body part of said first player-controlled character for display of said first pixels on a first display device;
(c) digitally transferring game data from said first processor through a data transmission link to said second processor;
(d) executing a second game program in said second processor in accordance with said transferred game data to generate second renderable polygon vertex data that represents body parts of a second 3-dimensional player-controlled character moving in a second simulated 3-dimensional game world; and (e) digitally rendering said second polygon vertex data to compute displayable second pixels that represent at least one body part of said second player-controlled character for display of said second pixels on said discrete display device in said portable game system.

119. The method of claim 118, wherein said portable game system further comprises at least one touch sensor that senses locations on said discrete display device of a physical object touching said touch sensor.

120. The method of claim 119, further comprising the steps of:

(f) modifying said second polygon vertex data in said second processor in accordance with movement of said touching object; and (g) texture mapping said modified polygon vertex data so that a textured portion of said second character moves in a direction indicated by said movement of said touching object for display on said discrete display device.

121. The method of claim 119, further comprising the steps of:

(f) modifying said second polygon vertex data in said second processor in accordance with movement of said touching object; and (g) texture mapping said modified polygon vertex data so that a textured portion of said second character moves toward a location indicated by said movement of said touching object for display on said discrete display device.

122. The method of claim 119, further comprising the step of:

modifying said second polygon vertex data in said second processor in accordance with movement of said touching object so as to change the shape of at least a portion of said second character.

123. The method of claim 119, further comprising the step of:

modifying said second polygon vertex data in said second processor in accordance with movement of said touching object so that a textured portion of said second character is displayed on said discrete display device moving together with said movement of said touching object.

124. The method of claim 119, further comprising the steps of:

(f) displaying a plurality of objects at predetermined locations on said discrete display device; and (g) sensing the location of one of said objects in accordance with a selected location of said touching object; and (h) storing input data corresponding to said selected location.

125. The method of claim 119, wherein said objects comprise at least one from the group comprising: numbers, letters, pictures, menu items, map locations, body parts, icons, weapons, and locations in one of said simulated worlds.

126. The method of claim 119, wherein at least one of said processors cooperates with a graphics coprocessor for performing one of said rendering steps.

* * * * *